US011878400B2

(12) United States Patent
Nettleton et al.

(10) Patent No.: US 11,878,400 B2
(45) Date of Patent: Jan. 23, 2024

(54) POWERED FASTENER DRIVER

(71) Applicant: MILWAUKEE ELECTRIC TOOL CORPORATION, Brookfield, WI (US)

(72) Inventors: Coby A. Nettleton, Milwaukee, WI (US); Leonard F. Mikat-Stevens, Milwaukee, WI (US); Alex D. Servais, Slinger, WI (US); Eric R. Albrecht, Waterford, WI (US); Jacob N. Zimmerman, Pewaukee, WI (US); John M. Jubeck, Mequon, WI (US); Andrew R. Palm, Shorewood, WI (US); Casey L. Bonath, Milwaukee, WI (US); Daniel J. Sheridan, Greendale, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/579,774

(22) Filed: Jan. 20, 2022

(65) Prior Publication Data

US 2022/0226977 A1 Jul. 21, 2022

Related U.S. Application Data

(60) Provisional application No. 63/180,722, filed on Apr. 28, 2021, provisional application No. 63/151,240, (Continued)

(51) Int. Cl.

*B25C 5/15* (2006.01)
*B25C 1/04* (2006.01)
(Continued)

(52) U.S. Cl.

CPC ................ *B25C 5/15* (2013.01); *B25C 1/001* (2013.01); *B25C 1/047* (2013.01); *B25C 1/06* (2013.01);

(Continued)

(58) Field of Classification Search

CPC .............. B25C 1/06; B25C 1/047; B25C 5/15
See application file for complete search history.

(56) References Cited

U.S. PATENT DOCUMENTS

| | | | |
|---|---|---|---|
| 662,587 | A | 11/1900 | Blake |
| 2,001,288 | A | 5/1935 | Schorr |

(Continued)

FOREIGN PATENT DOCUMENTS

| | | | |
|---|---|---|---|
| CA | 2209875 | C | 6/2001 |
| CN | 203804923 | U | 9/2014 |

(Continued)

OTHER PUBLICATIONS

International Search Report and Written Opinion for Application No. PCT/US2022/013053 dated Jun. 30, 2022 (14 pages).

(Continued)

*Primary Examiner* — Joshua G Kotis
(74) *Attorney, Agent, or Firm* — Michael Best & Friedrich LLP

(57) ABSTRACT

A fastener driver includes a housing defining a head portion and a handle portion, a drive mechanism positioned within the housing, and a firing mechanism. The firing mechanism includes a primary guide member supported within the head portion of the housing, a secondary guide member spaced from the primary guide member and supported within the head portion of the housing, a piston slidable along the primary guide member and the secondary guide member, a driver blade attached to the piston and configured to be movable along a drive axis, and a biasing member configured to move the piston and the driver blade from a top dead center (TDC) position toward a bottom dead center (BDC) position. A lifter assembly is operated by the drive mechanism to return the piston and the driver blade towards the TDC position, against the bias of the biasing member.

19 Claims, 19 Drawing Sheets

Related U.S. Application Data filed on Feb. 19, 2021, provisional application No. 63/139,549, filed on Jan. 20, 2021.

(51) Int. Cl.

| | |
|---|---|
| ***B25C 1/06*** | (2006.01) |
| ***B25C 1/00*** | (2006.01) |
| ***B25C 5/13*** | (2006.01) |
| ***B25C 1/12*** | (2006.01) |
| ***B25C 1/18*** | (2006.01) |

(52) U.S. Cl.

CPC ............. *B25C 1/123* (2013.01); *B25C 1/188* (2013.01); *B25C 5/13* (2013.01)

(56) References Cited

U.S. PATENT DOCUMENTS

| | | | |
|---|---|---|---|
| 2,003,062 | A | 5/1935 | Wickwire |
| 2,351,608 | A | 6/1944 | Greenwood |
| 2,441,552 | A | 5/1948 | Barnes |
| 2,526,902 | A | 10/1950 | Rublee |
| 2,632,356 | A | 3/1953 | Thiel |
| 2,801,415 | A | 8/1957 | Jenny |
| 2,801,417 | A | 8/1957 | Jenny |
| 2,801,418 | A | 8/1957 | Jenny |
| 2,918,674 | A | 12/1959 | Skumawitz |
| 2,983,255 | A | 5/1961 | Crooks et al. |
| 3,049,715 | A | 8/1962 | Allen |
| 3,103,013 | A | 9/1963 | Walter et al. |
| 3,170,160 | A | 2/1965 | Burniston |
| 3,198,412 | A | 8/1965 | Roosa |
| 3,407,983 | A | 10/1968 | Kotas |
| 3,593,902 | A | 7/1971 | Boye |
| 3,606,128 | A | 9/1971 | Cast et al. |
| 3,615,049 | A | 10/1971 | Obergfell et al. |
| 3,894,174 | A | 7/1975 | Cartun |
| 3,924,692 | A | 12/1975 | Saari |
| 3,940,844 | A | 3/1976 | Colby et al. |
| 4,129,059 | A | 12/1978 | Van Eck |
| 4,197,974 | A | 4/1980 | Morton et al. |
| 4,227,637 | A | 10/1980 | Haytayan |
| D261,356 | S | 10/1981 | Robinson |
| 4,452,387 | A | 6/1984 | Haytayan |
| 4,463,888 | A | 8/1984 | Geist et al. |
| 4,515,303 | A | 5/1985 | Schadlich et al. |
| 4,597,517 | A | 7/1986 | Wagdy |
| 4,624,401 | A | 11/1986 | Gassner et al. |
| 4,697,045 | A | 9/1987 | Beatty |
| 4,804,127 | A | 2/1989 | Kirkman |
| 4,811,885 | A | 3/1989 | Lai |
| 5,094,380 | A | 3/1992 | Nasiatka |
| D330,699 | S | 11/1992 | Gill |
| 5,180,091 | A | 1/1993 | Ota |
| 5,197,647 | A | 3/1993 | Howell |
| 5,322,189 | A | 6/1994 | Oda |
| 5,433,367 | A | 7/1995 | Liu |
| 5,503,319 | A | 4/1996 | Lai |
| 5,593,079 | A | 1/1997 | Mukoyama et al. |
| 5,620,289 | A | 4/1997 | Curry |
| 5,626,274 | A | 5/1997 | Shkolnikov et al. |
| 5,720,423 | A | 2/1998 | Kondo et al. |
| 5,735,444 | A | 4/1998 | Wingert |
| 5,794,831 | A | 8/1998 | Velan et al. |
| 5,816,468 | A | 10/1998 | Yang |
| D402,540 | S | 12/1998 | Stridh |
| 5,911,350 | A | 6/1999 | Bolger et al. |
| 6,149,046 | A | 11/2000 | Ho et al. |
| 6,199,739 | B1 | 3/2001 | Mukoyama et al. |
| 6,209,770 | B1 | 4/2001 | Perra |
| 6,296,167 | B1 | 10/2001 | Jen |
| 6,305,891 | B1 | 10/2001 | Burlingame |
| 6,450,387 | B1 | 9/2002 | Chen |
| 6,530,803 | B1 | 3/2003 | Chen |
| 6,592,014 | B2 | 7/2003 | Smolinski |
| 6,648,202 | B2 | 11/2003 | Miller et al. |
| 6,679,413 | B2 | 1/2004 | Miller et al. |
| 6,772,931 | B2 | 8/2004 | Miller et al. |
| 6,908,021 | B1 | 6/2005 | Wang |
| 6,938,812 | B2 | 9/2005 | Miller et al. |
| 6,964,362 | B2 | 11/2005 | Shkolnikov et al. |
| 6,966,476 | B2 | 11/2005 | Jalbert et al. |
| 6,966,477 | B1 | 11/2005 | Chien-Kuo et al. |
| 7,000,294 | B2 | 2/2006 | Kakuda et al. |
| 7,021,511 | B2 | 4/2006 | Popovich et al. |
| 7,032,794 | B1 | 4/2006 | Hung et al. |
| 7,032,797 | B2 | 4/2006 | Liao |
| 7,059,507 | B2 | 6/2006 | Almeras et al. |
| 7,086,573 | B1 | 8/2006 | Wen |
| 7,134,586 | B2 | 11/2006 | McGee et al. |
| 7,152,774 | B2 | 12/2006 | Chen |
| 7,175,064 | B2 | 2/2007 | Schell et al. |
| 7,185,712 | B2 | 3/2007 | Miller et al. |
| 7,303,103 | B2 | 12/2007 | Wang |
| 7,313,103 | B2 | 12/2007 | Cox et al. |
| 7,320,422 | B2 | 1/2008 | Schell et al. |
| 7,328,826 | B2 | 2/2008 | Shkolnikov |
| 7,445,139 | B2 | 11/2008 | Okouchi |
| 7,494,037 | B2 | 2/2009 | Simonelli et al. |
| 7,506,787 | B2 | 3/2009 | Wu et al. |
| 7,513,403 | B2 | 4/2009 | Fujimoto |
| 7,520,414 | B2 | 4/2009 | Blessing et al. |
| 7,527,106 | B2 | 5/2009 | Miller et al. |
| 7,549,562 | B2 | 6/2009 | Wu et al. |
| 7,575,141 | B1 | 8/2009 | Liang et al. |
| 7,641,089 | B2 | 1/2010 | Schell et al. |
| 7,874,778 | B1 | 1/2011 | Derrig et al. |
| 7,905,377 | B2 | 3/2011 | Krondorfer et al. |
| 7,905,379 | B2 | 3/2011 | Lee |
| 7,918,374 | B2 | 4/2011 | Gardner et al. |
| 7,934,565 | B2 | 5/2011 | Krondorfer |
| 7,938,305 | B2 | 5/2011 | Simonelli et al. |
| 7,980,439 | B2 | 7/2011 | Akiba et al. |
| 8,006,883 | B2 | 8/2011 | Schell et al. |
| 8,011,441 | B2 | 9/2011 | Leimbach et al. |
| 8,011,547 | B2 | 9/2011 | Leimbach et al. |
| 8,011,548 | B2 | 9/2011 | Chang |
| 8,042,717 | B2 | 10/2011 | Lam et al. |
| 8,047,414 | B2 | 11/2011 | Kunz et al. |
| 8,074,855 | B2 | 12/2011 | Johnson |
| 8,118,203 | B2 | 2/2012 | Lee |
| 8,162,073 | B2 | 4/2012 | Krondorfer et al. |
| 8,220,686 | B2 | 7/2012 | Kestner et al. |
| 8,230,941 | B2 | 7/2012 | Leimbach et al. |
| 8,245,896 | B2 * | 8/2012 | Gschwend ................ B25C 1/06 267/89 |
| 8,267,296 | B2 | 9/2012 | Leimbach et al. |
| 8,267,297 | B2 | 9/2012 | Leimbach et al. |
| 8,282,328 | B2 | 10/2012 | Gardner et al. |
| 8,286,722 | B2 | 10/2012 | Leimbach et al. |
| 8,292,143 | B2 | 10/2012 | Lee et al. |
| 8,292,144 | B2 | 10/2012 | Maltais et al. |
| 8,303,226 | B1 | 11/2012 | Derrig et al. |
| 8,336,748 | B2 | 12/2012 | Hlinka et al. |
| 8,387,718 | B2 | 3/2013 | Leimbach et al. |
| 8,413,865 | B2 | 4/2013 | Mandel et al. |
| 8,413,867 | B2 | 4/2013 | Gardner et al. |
| 8,505,798 | B2 | 8/2013 | Simonelli et al. |
| 8,556,148 | B2 | 10/2013 | Schell et al. |
| 8,567,654 | B2 | 10/2013 | Wu et al. |
| 8,602,282 | B2 | 12/2013 | Leimbach et al. |
| 8,690,036 | B2 | 4/2014 | Schell et al. |
| D705,930 | S | 5/2014 | Cheney |
| 8,733,609 | B2 | 5/2014 | Weigmann et al. |
| D707,357 | S | 6/2014 | Cheney et al. |
| 8,746,526 | B2 | 6/2014 | Hlinka et al. |
| 8,763,874 | B2 | 7/2014 | McCardle et al. |
| 8,777,079 | B2 | 7/2014 | Po et al. |
| 8,833,626 | B2 | 9/2014 | Perron et al. |
| 8,840,002 | B2 | 9/2014 | Ito et al. |
| 8,858,146 | B1 | 10/2014 | Derrig et al. |
| 8,899,460 | B2 | 12/2014 | Wojcicki |
| 8,939,340 | B2 | 1/2015 | Gardner et al. |
| 9,011,063 | B1 | 4/2015 | Derrig et al. |
| 9,221,161 | B2 | 12/2015 | Miller et al. |

(56) References Cited

U.S. PATENT DOCUMENTS

| | | | |
|---|---|---|---|
| 9,302,381 | B2 | 4/2016 | Kondou et al. |
| 9,381,633 | B2 | 7/2016 | Moore et al. |
| 9,422,962 | B1 | 8/2016 | Stratton et al. |
| 9,469,021 | B2 | 10/2016 | Gregory et al. |
| 9,486,904 | B2 | 11/2016 | Gregory et al. |
| 9,498,871 | B2 | 11/2016 | Gregory et al. |
| 9,505,115 | B2 | 11/2016 | Kondou et al. |
| 9,527,197 | B2 | 12/2016 | Blessing et al. |
| 9,550,288 | B2 | 1/2017 | Moore et al. |
| 9,616,561 | B2 | 4/2017 | Liu et al. |
| 9,643,305 | B2 | 5/2017 | Gregory et al. |
| 9,649,755 | B2 | 5/2017 | Gregory et al. |
| 9,676,088 | B2 | 6/2017 | Leimbach et al. |
| 9,782,880 | B2 | 10/2017 | Moore et al. |
| 9,796,072 | B2 | 10/2017 | Young |
| 9,827,658 | B2 | 11/2017 | Gregory et al. |
| 9,849,502 | B2 | 12/2017 | Gaertner et al. |
| D836,072 | S | 12/2018 | Gray |
| 10,213,911 | B2 | 2/2019 | Moore et al. |
| 10,363,650 | B2 | 7/2019 | Miyashita et al. |
| 10,377,026 | B2 | 8/2019 | Kondou et al. |
| 10,442,066 | B2 | 10/2019 | Nishikawa et al. |
| 10,478,954 | B2 | 11/2019 | Leimbach et al. |
| 10,525,575 | B2 | 1/2020 | Tanji |
| 10,632,604 | B2 | 4/2020 | Perron et al. |
| 10,662,991 | B2 | 5/2020 | Gray |
| 10,695,899 | B2 * | 6/2020 | Scott ........................ B25C 1/041 |
| 10,888,981 | B2 | 1/2021 | Gregory et al. |
| 10,926,387 | B2 | 2/2021 | Moore et al. |
| 10,967,491 | B2 | 4/2021 | Yasutomi et al. |
| 11,090,794 | B2 | 8/2021 | Fairbanks et al. |
| 2002/0079111 | A1 | 6/2002 | Camp |
| 2002/0117531 | A1 | 8/2002 | Schell et al. |
| 2002/0134811 | A1 | 9/2002 | Napier et al. |
| 2003/0000990 | A1 | 1/2003 | White et al. |
| 2003/0099102 | A1 | 5/2003 | Duval |
| 2003/0121948 | A1 | 7/2003 | Hsien |
| 2004/0126201 | A1 | 7/2004 | Kobylinski et al. |
| 2004/0247415 | A1 | 12/2004 | Peter, Jr. |
| 2004/0262461 | A1 | 12/2004 | Del Re et al. |
| 2006/0086589 | A1 | 4/2006 | Chen |
| 2006/0091177 | A1 * | 5/2006 | Cannaliato .............. B25C 1/008 227/8 |
| 2006/0233628 | A1 | 10/2006 | Lee |
| 2008/0017689 | A1 | 1/2008 | Simonelli et al. |
| 2008/0048000 | A1 | 2/2008 | Simonelli et al. |
| 2008/0067212 | A1 | 3/2008 | Wen |
| 2008/0073405 | A1 | 3/2008 | Shima et al. |
| 2008/0164295 | A1 | 7/2008 | Wu et al. |
| 2009/0261141 | A1 | 10/2009 | Stratton et al. |
| 2010/0009608 | A1 | 1/2010 | Lo et al. |
| 2010/0147919 | A1 | 6/2010 | Schiestl |
| 2011/0220702 | A1 | 9/2011 | Chen et al. |
| 2011/0262247 | A1 | 10/2011 | Kanai |
| 2013/0320063 | A1 | 12/2013 | Gregory et al. |
| 2013/0320064 | A1 | 12/2013 | Gregory et al. |
| 2014/0014703 | A1 | 1/2014 | Kestner et al. |
| 2014/0021237 | A1 | 1/2014 | Chang |
| 2014/0034700 | A1 | 2/2014 | Chang |
| 2014/0361066 | A1 | 12/2014 | Liu et al. |
| 2015/0063949 | A1 | 3/2015 | Young |
| 2015/0202755 | A1 | 7/2015 | Tanji |
| 2016/0368126 | A1 | 12/2016 | Liu et al. |
| 2017/0036333 | A1 | 2/2017 | Lin et al. |
| 2017/0157758 | A1 | 6/2017 | Howe |
| 2017/0274511 | A1 | 9/2017 | Huang |
| 2018/0029211 | A1 | 2/2018 | Young |
| 2018/0085904 | A1 | 3/2018 | Gregory et al. |
| 2018/0093370 | A1 | 4/2018 | Yip et al. |
| 2018/0099400 | A1 | 4/2018 | Wong et al. |
| 2019/0039219 | A1 | 2/2019 | Suarez |
| 2019/0091845 | A1 * | 3/2019 | Wyler ........................ B25C 1/06 |
| 2019/0101147 | A1 | 4/2019 | Fairbanks et al. |
| 2019/0152034 | A1 | 5/2019 | Kargenian et al. |
| 2019/0154070 | A1 | 5/2019 | Kargenian et al. |
| 2019/0154071 | A1 | 5/2019 | Tao |
| 2019/0255689 | A1 | 8/2019 | Leimbach et al. |
| 2019/0299379 | A1 | 10/2019 | Kondou et al. |
| 2019/0299380 | A1 * | 10/2019 | Meyer ...................... B25C 1/008 |
| 2019/0337135 | A1 | 11/2019 | Kargenian et al. |
| 2020/0070330 | A1 | 3/2020 | Carrier et al. |
| 2020/0083691 | A1 | 3/2020 | Kawashima |
| 2020/0114500 | A1 | 4/2020 | Bierdeman et al. |
| 2021/0078149 | A1 * | 3/2021 | Pedicini .................. B25C 1/047 |
| 2021/0107125 | A1 | 4/2021 | Gregory et al. |
| 2021/0131470 | A1 | 5/2021 | Wei |
| 2021/0372451 | A1 | 12/2021 | Nettleton |

FOREIGN PATENT DOCUMENTS

| | | | |
|---|---|---|---|
| CN | 102773835 | B | 3/2016 |
| ES | 1009747 | U | 10/1989 |
| GB | 257753 | A | 9/1926 |
| GB | 843061 | A | 8/1960 |
| GB | 2238591 | A | 6/1991 |
| JP | S5676280 | A | 6/1981 |
| JP | S56118770 | A | 9/1981 |
| JP | H0293109 | A | 4/1990 |
| JP | H02203004 | A | 8/1990 |
| JP | 2002130232 | A | 5/2002 |
| JP | 2008238290 | A | 10/2008 |
| JP | 2016172289 | A * | 9/2016 |
| JP | 2016172289 | A | 9/2016 |
| JP | 2020019074 | A | 2/2020 |
| KR | 1020180097411 | A | 8/2018 |
| WO | 2007142996 | A2 | 12/2007 |
| WO | 2008094953 | A2 | 8/2008 |
| WO | 2020008768 | A1 | 1/2020 |

OTHER PUBLICATIONS

DeWalt, “DCN701 20V Max* Cordless Cable Stapler,” Instruction Manual, © 2018 (52 pages).

Extended European Search Report for Application No. 23159877.2 dated Nov. 15, 2023 (7 pages).

* cited by examiner

POWERED FASTENER DRIVER

CROSS-REFERENCE TO RELATED APPLICATIONS

This application claims priority to U.S. Provisional Patent Application No. 63/180,722 filed on Apr. 28, 2021, U.S. Provisional Patent Application No. 63/151,240 filed on Feb. 19, 2021, and U.S. Provisional Patent Application No. 63/139,549 filed on Jan. 20, 2021, the entire contents of all of which are incorporated herein by reference.

FIELD OF THE INVENTION

The present invention relates to a powered fastener driver, and more particularly to a battery powered fastener driver.

BACKGROUND OF THE INVENTION

There are various fastener drivers known in the art for driving fasteners (e.g., nails, tacks, staples, etc.) into a workpiece. These fastener drivers operate utilizing various means known in the art (e.g., compressed air generated by an air compressor, electrical energy, a flywheel mechanism, etc.), but often these designs are met with power, size, and cost constraints.

SUMMARY OF THE INVENTION

The present invention provides, in one aspect, a fastener driver comprising a housing defining a head portion and a handle portion, a drive mechanism positioned within the housing, and a firing mechanism including a primary guide member supported within the head portion of the housing, a secondary guide member spaced from the primary guide member and supported within the head portion of the housing, a piston slidable along the primary guide member and the secondary guide member, a driver blade attached to the piston and configured to be movable along a drive axis. A biasing member configured to move the piston and the driver blade from a top dead center (TDC) position toward a bottom dead center (BDC) position and a lifter assembly operated by the drive mechanism to return the piston and the driver blade towards the TDC position, against the bias of the biasing member.

The invention provides, in another aspect, a fastener driver comprising a housing defining a head portion and a handle portion; a drive mechanism positioned within the housing; a firing mechanism including a primary guide member supported within the head portion of the housing, a piston slidable along the primary guide member, a driver blade attached to the piston, and a biasing member configured to move the piston and the driver blade from a top dead center (TDC) position toward a bottom dead center (BDC) position; a lifter assembly operated by the drive mechanism to return the piston and the driver blade towards the TDC position, against the bias of the biasing member; and a frame located within the housing and configured to support the lifter assembly and the primary guide member.

The invention provides, in another aspect, a fastener driver comprising a housing defining a head portion and a handle portion; a drive mechanism positioned within the housing; a firing mechanism including a piston and a driver blade that are moveable from a top dead center (TDC) position toward a bottom dead center (BDC) position; and a lifter assembly operated by the drive mechanism to rotate about a rotational axis to return the piston and the driver blade towards the TDC position, the lifter assembly including a first eccentric pin located at a first radial distance relative to the rotational axis, and a second eccentric pin located at a second radial distance relative to the rotational axis, the second radial distance being less than the first radial distance.

The invention provides, in another aspect, a fastener driver comprising a magazine configured to receive fasteners therein, the magazine including a magazine cover having a length extending along a longitudinal axis between a first end and a second end, a top surface having an opening defined therein proximate the second end, and a bottom surface opposite the top surface, and a magazine body slidably movable relative to the magazine cover from a closed position to an open position for reloading the magazine with fasteners; a nosepiece including a fastener driving channel from which consecutive fasteners from the magazine are driven, the nosepiece adjacent the first end of the magazine cover; a latch coupled to the top surface of the magazine cover, the latch extending through the opening in the top surface of the magazine cover, the latch including a latch projection that defines a first contact surface; a pusher body slidably coupled to the magazine body, the pusher body including an arm member that defines a second contact surface; and a biasing member configured to bias the pusher body and the fasteners within the magazine toward the nosepiece when the magazine body is in the closed position, wherein the first and second contact surfaces are engageable to hold the pusher body in a latched position when the magazine body is in the open position.

The invention provides, in another aspect, a fastener driver comprising a fastener driver comprising a magazine configured to receive collated fastener strips therein, the magazine including a magazine cover having a length extending along a longitudinal axis between a first end and a second end, a top surface, parallel side walls respectively extending from opposite sides of the top surface, and a rib extending inward from at least one of the side walls along a first portion of the length of the magazine cover, the magazine cover configured to receive the collated fastener strips between the side walls along a second portion of the length of the magazine cover, the rib configured to restrict installation or removal of the collated fastener strips located within the first portion of the length of the magazine cover, and a magazine body slidably movable relative to the magazine cover from a closed position to an open position for reloading the magazine with collated fastener strips; and a nosepiece including a fastener driving channel from which consecutive fasteners from the magazine are driven, the nosepiece adjacent the first end of the magazine cover.

The invention provides, in another aspect, a fastener driver comprising a magazine configured to receive collated fastener strips therein, the magazine including a magazine cover having a length extending along a longitudinal axis between a first end and a second end, a top surface, parallel side walls respectively extending from opposite sides of the top surface, and a rib extending inward from at least one of side walls along the length of the magazine cover, the magazine cover configured to receive the collated fastener strips through the second end of the magazine cover and between the side walls, the rib configured to restrict installation or removal of the collated fastener strips after being inserted through the second end of the magazine cover, and a magazine body slidably movable relative to the magazine cover from a closed position to an intermediate position, and pivotable relative to the magazine cover from the intermediate position to an open position for reloading the magazine; and a nosepiece including a fastener driving channel from which consecutive fasteners from the magazine are driven, the nosepiece adjacent the first end of the magazine cover.

The invention provides, in another aspect, a fastener driver comprising a housing defining a head portion and a handle portion; a drive mechanism positioned within the housing; a firing mechanism including a piston and a driver blade that are moveable from a top dead center (TDC) position toward a bottom dead center (BDC) position; and a lifter assembly operated by the drive mechanism to rotate about a rotational axis, the lifter assembly including a unitary body having an input shaft that is coupled to the drive mechanism to receive torque therefrom and a hub that selectively engages a portion of the firing mechanism to return the piston and the driver blade towards the TDC position.

The invention provides, in another aspect, a fastener driver comprising a magazine having a length extending along a longitudinal axis between a first end and a second end, the magazine configured to receive a collated fastener strip therein, the collated fastener strip including a plurality of fasteners having a crown section and a tip opposing the crown section; a nosepiece including a fastener driving channel from which consecutive fasteners from the magazine are driven, the nosepiece located adjacent the first end of the magazine; and a fastener alignment mechanism positioned adjacent the first end of the magazine, the fastener alignment mechanism including a magnetic element that produces a magnetic force on the tip of the fastener adjacent the fastener driving channel to urge the tip of the fastener towards the nosepiece, wherein the magnetic force urges the fastener towards a loading position in which the fastener aligns with the fastener driving channel of the nosepiece.

The invention provides, in another aspect, a fastener driver comprising a magazine having a length extending along a longitudinal axis between a first end and a second end, the magazine configured to receive a collated fastener strip therein; and a nosepiece including a fastener driving channel from which consecutive fasteners from the magazine are driven, the nosepiece located adjacent the first end of the magazine, the nosepiece including an interior surface configured to receive a cable being secured to a workpiece during a fastener driving operation, the interior surface including a first portion having a first width and a second portion having a second width, the second width being greater than the first width.

The invention provides, in another aspect, a fastener driver comprising a housing defining a head portion and a handle portion; an end cap supported within the head portion, the end cap including a first recess, a second recess surrounded by the first recess, and an outer sleeve surrounding the first recess; a drive mechanism positioned within the housing; a firing mechanism including a piston, a driver blade attached to the piston, a first biasing member having a first end supported within the piston and a second end seated within the first recess of the end cap, and a second biasing member having a first end supported within the piston and a second end seated within the second recess of the end cap, the first and second biasing members configured to move the piston and the driver blade from a top dead center (TDC) position toward a bottom dead center (BDC) position; a washer positioned between the second end of the first biasing member and the end cap, the washer being supported within the first recess of the end cap; and a lifter assembly operated by the drive mechanism to return the piston and the driver blade towards the TDC position, against the bias of the first and second biasing members.

The invention provides, in another aspect, a fastener driver comprising A fastener driver comprising a front end a housing defining a head portion having a rear end and a handle portion; a drive mechanism positioned within the housing; a battery pack coupled to a battery receptacle, the battery pack configured to provide power to the drive mechanism; and a firing mechanism including a piston, and a driver blade attached to the piston, the driver blade configured to move from a top dead center (TDC) position toward a bottom dead center (BDC) position, wherein the fastener driver has a length defined between the front end and the rear end, and wherein the length is less than or equal to 18 centimeters.

The invention provides, in another aspect a fastener driver comprising a housing defining a head portion and a handle portion; a drive mechanism positioned within the housing; a firing mechanism configured to be actuated in response to an input from the drive mechanism, the firing mechanism including a piston, a driver blade attached to the piston, and a biasing member configured to move the piston and the driver blade from a top dead center (TDC) position toward a bottom dead center (BDC) position, wherein the biasing member stores at least 14.5 Joules of energy when the driver blade is in the TDC position.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
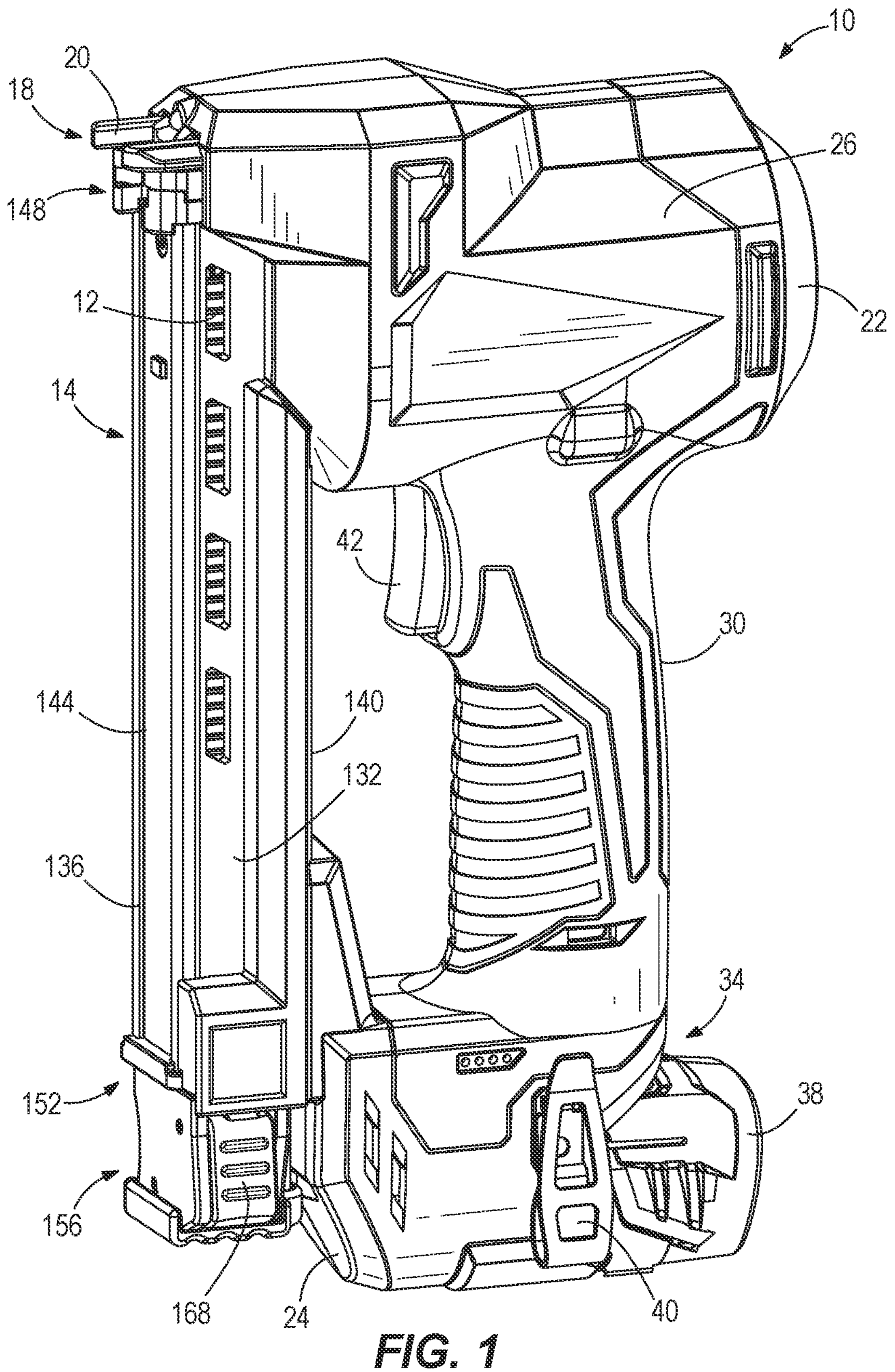
FIG. 1 is a perspective view of a powered fastener driver.

FIG. 1 illustrates a powered fastener driver 10 (e.g., a cable stapler) for driving fasteners 12 (e.g., staples of a staple collation) held within a magazine 14 into a workpiece. The driver 10 includes a nosepiece 18 that sequentially receives the fasteners from the magazine 14 prior to each fastener-driving operation. The nosepiece 18 includes a contact trip 20 that allows the driver 10 to be operated in a single shot mode. In some embodiments of the driver 10, the contact trip 20 may permit operation in the single shot mode and/or a bump or continuous shot mode. The driver 10 includes a housing 22 defining a head portion 26, a handle portion 30, and a battery receptacle portion 34 that receives a battery pack 38. In the illustrated embodiment, the housing 22 is longitudinally split at a parting line 24 into first and second housing portions. The driver 10 further includes a belt clip 40 secured to the housing 22 adjacent the battery receptacle 34.

Figure 2:
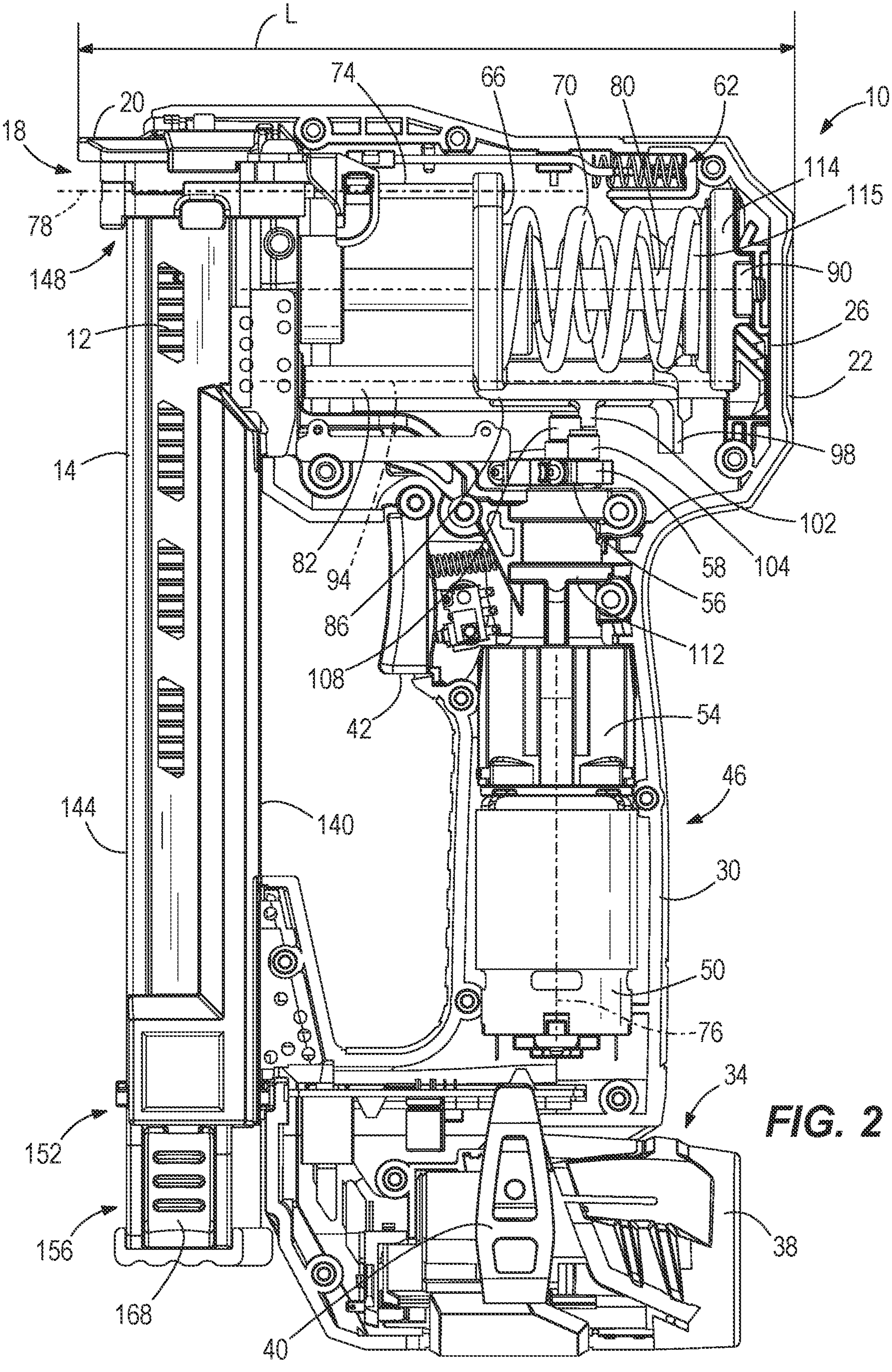
FIG. 2 is a side view of the powered fastener driver of FIG. 1, with portions removed for clarity, illustrating a drive mechanism, a firing mechanism, and a lifter assembly.

With reference to FIG. 2, the driver 10 includes a trigger 42 that selectively provides power to a drive mechanism 46 enclosed within the handle portion 30 of the driver 10. The drive mechanism 46 includes an electric motor 50, a gear box 54 that receives torque from the motor 50, and an output shaft 56 driven by the gear box 54. In some embodiment, the motor 50 is a brushed DC motor that receives power from the battery pack 38. In some embodiments of the driver 10, the motor 50 may be configured as a brushless direct current (DC) motor.

Figure 4:
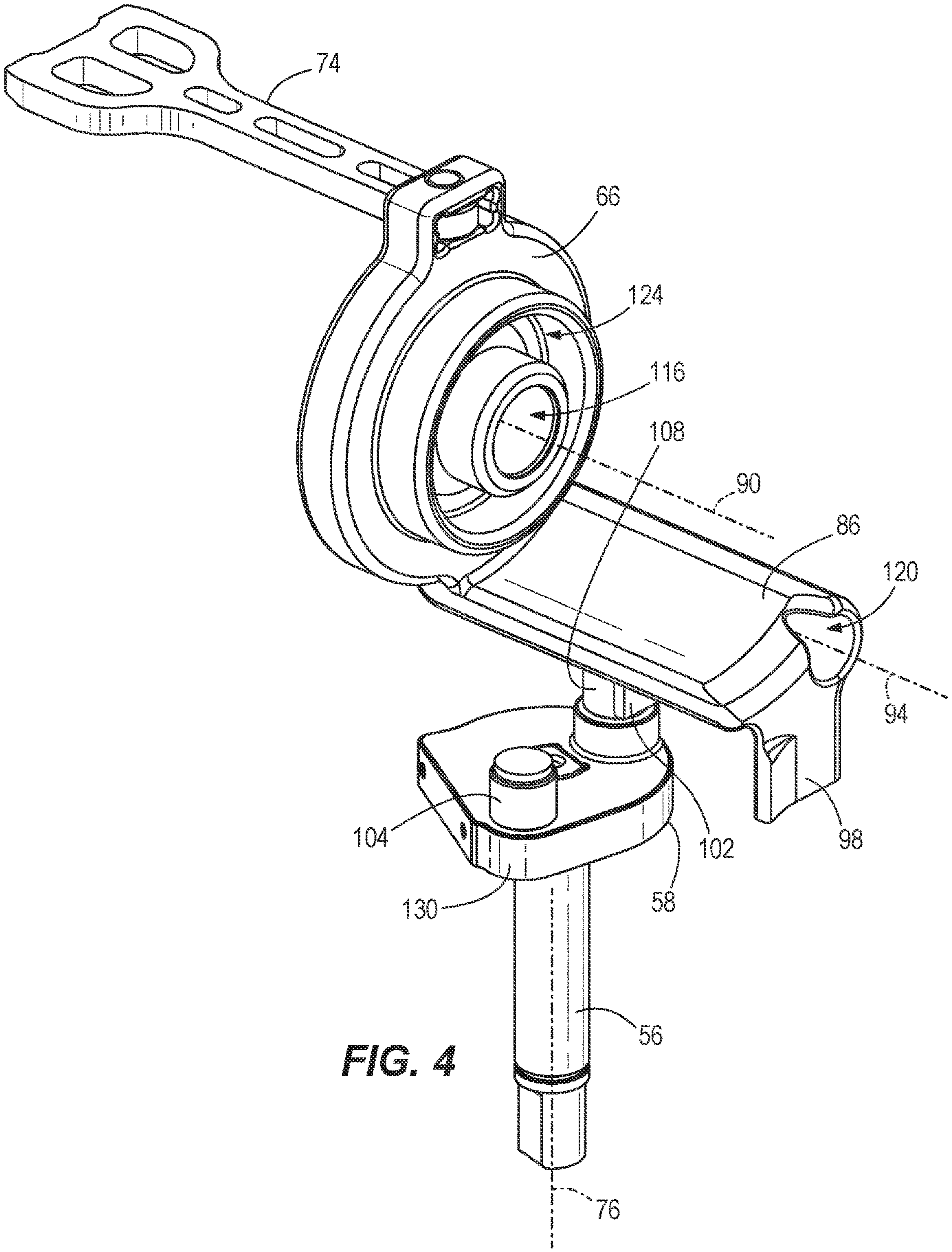
FIG. 4 is a perspective view of a portion of the lifter assembly and the firing mechanism of FIG. 3.

The powered fastener driver 10 includes a firing mechanism 62 within the head portion 26 of the housing 22. The firing mechanism 62 is coupled to the drive mechanism 46 and is operable to perform a fastener driving operation. The firing mechanism 62 includes a movable member (e.g., a piston 66) for reciprocal movement within the head portion 26, a biasing member (e.g., one or more compression springs 70, 72) seated against the piston 66, and a driver blade 74 attached to the piston 66 (FIG. 4). The biasing member 70 urges the piston 66 and the driver blade 74 within the head portion 26 towards a driven or bottom-dead center (BDC) position to drive the fastener 12 into the workpiece. In the illustrated embodiment, the biasing member includes a nested pair of compression springs 70, 72 that act in unison to urge the piston 66 and the driver blade 74 towards the BDC position.

A lifter assembly 58 is positioned between the drive mechanism 46 and the firing mechanism 62 and is operated by the drive mechanism 46 to return the piston 66 and the driver blade 74 towards a top-dead center (TDC) position, against the bias of the biasing member 70. During a driving cycle, the biasing member 70 of the firing mechanism 62 urges the driver blade 74 and piston 66 from the TDC position towards the BDC position to fire a fastener into the workpiece. The lifter assembly 58, which is driven by the drive mechanism 46, is operable to move the piston 66 and the driver blade 74 from the BDC position toward the TDC position, stopping short of the TDC position at an intermediate ready position, so the firing mechanism 62 is ready for a subsequent fastener driving operation.

Figure 3:
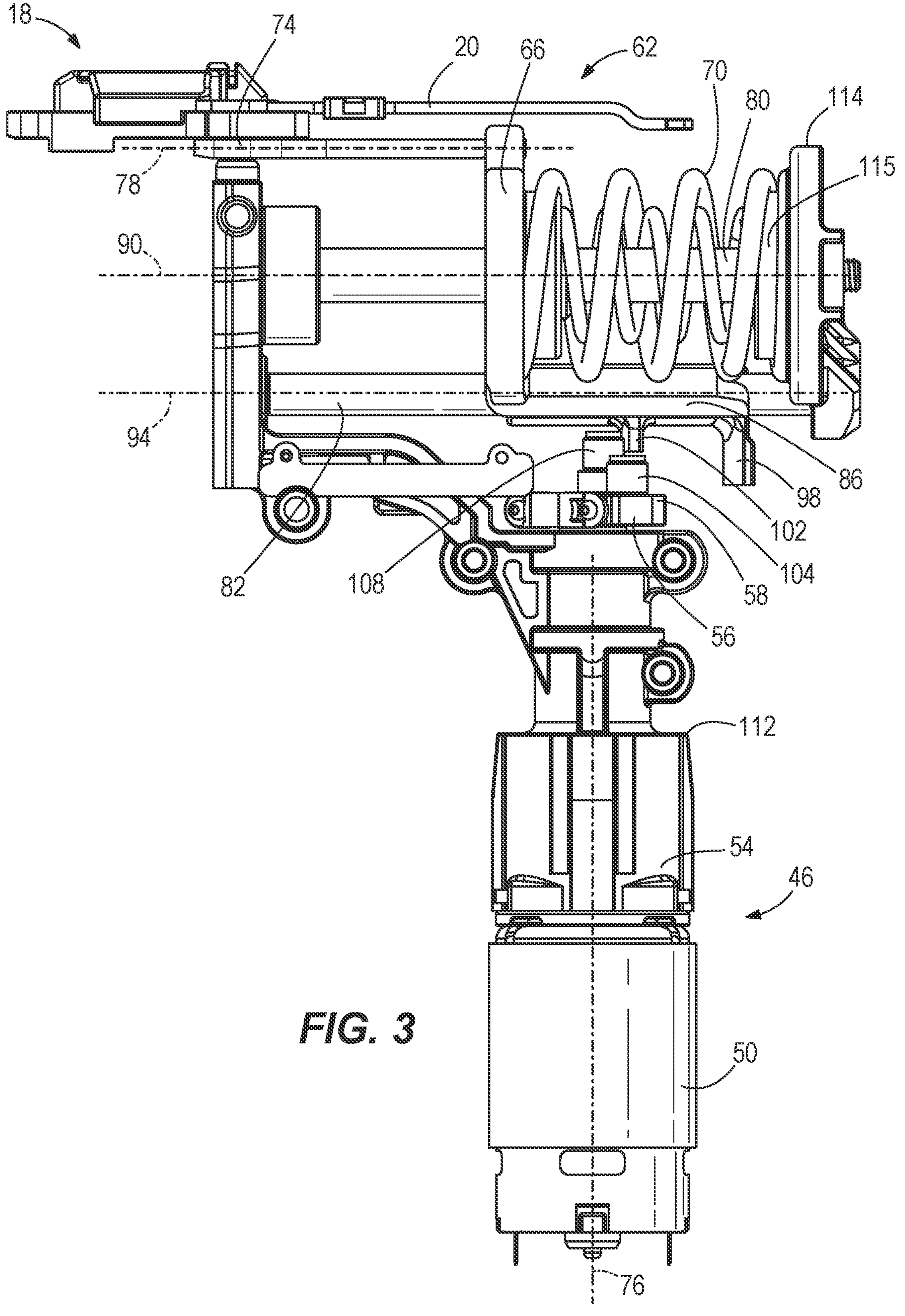
FIG. 3 is a side view of the drive mechanism, the firing mechanism, and the lifter assembly of the powered fastener driver of FIG. 1.

Now with reference to FIGS. 2 and 3, the driver 10 further includes a primary guide member (e.g., primary guide post 80) that slidably supports the piston 66 and a secondary guide member (e.g., secondary post 82), which slidably supports a bracket 86 coupled for movement with the piston 66, spaced from the primary guide post 80. The secondary post 82 is positioned between the primary guide post 80 and the lifter assembly 58 and is configured to slidably support the bracket 86. Because in the illustrated embodiment the piston 66 and the bracket 86 are integrally formed as a single piece, both of the primary and secondary guide posts 80, 82 slidably support the piston 66. In the illustrated embodiment, a primary guide axis 90 extends centrally through the primary guide post 80 and a secondary guide axis 94 extends centrally through the secondary post 82. The primary guide axis 90, the secondary guide axis 94, and the drive axis 78 are oriented parallel with each other and are each transverse to the motor axis 76. The primary and secondary guide posts 80, 82 are each cylindrical posts define guide surfaces that are devoid of any threads so the piston 66 can freely move along the primary and secondary guide posts 80, 82 in response to rotation of the lifter assembly 58

Now with reference to FIG. 4, the lifter assembly 58 and the piston 66 is illustrated in detail. The piston 66 defines a first bore 116 that is sized to receive and support the primary guide post 80 (FIG. 3) along the primary guide axis 90, a second bore 120 formed in the bracket 86, which is sized to receive and support the secondary guide post 82 (FIG. 3) along the secondary guide axis 94, and a cavity 124 surrounding the first bore 116 and sized to receive the biasing member 70 (FIG. 3). In the illustrated embodiment, the bracket 86 is integrally formed with the piston 66. In other embodiments, the bracket 86 may be formed separate from the piston 66 and may be coupled to the piston 66.

The bracket 86 includes a first protrusion 98 and a second protrusion 102 vertically spaced from the first protrusion 98 along the axis 94. The first and second protrusions 98, 102 each extend towards the lifter assembly 58. In the illustrated embodiment, the first protrusion 98 extends further from the bracket 86 (e.g., towards the lifter assembly 58) than the second protrusion 102. In other words, the first protrusion 98 is longer than the second protrusion 102. The lifter assembly 58 includes a first eccentric pin 104 and a second eccentric pin 108 that selectively engage with a corresponding one of the first and second protrusions 98, 102 formed on the bracket 86 of the piston 66. In the illustrated embodiment, the second eccentric pin 108 extends further from the lifter assembly 58 (e.g., towards the bracket 86) than the first eccentric pin 104 so the second eccentric pin 108 is sized to engage with the second protrusion 102. In other words, the second eccentric pin 108 is longer than the first eccentric pin 104. The construction of the lifter assembly 58 and the bracket 86 displaces the piston 66 and the driver blade 74 from the BDC position toward the TDC position during a single fastener driving cycle. Because the secondary guide member 82 is positioned adjacent and in close proximity to the lifter assembly 58 (e.g., in the bore 120), the physical deflection of the bracket 86, and thus the amount of bending stress experienced by the bracket 86, is reduced when the lifter assembly 58 moves the piston towards the TDC position.

With continued reference to FIGS. 2 and 3, the fastener driver 10 includes a frame 112 coupled to the housing 22 for supporting the lifter assembly 58 and a first end of each of the primary and secondary guide posts 80, 82. The frame 112 also defines a housing, which is a component of the gear box 54, in which a gear train (not shown) is located. In other words, the gear box 54 is integrally formed on the frame 112. The output shaft 56 extends through an aperture in the frame 112 with the lifter assembly 58 located adjacent and in close proximity to a vertical face of the frame 112 oriented perpendicular to the axis 76. An end cap 114 within the housing 22 supports an opposite, second end of each of the primary and secondary guide posts 80, 82. The end cap 114 includes a seat 115 (FIG. 3) against which a top end of the spring 70 is seated. The frame 112 is constructed as a single member, which supports the lifter assembly 58, while allowing rotatable movement of the lifter assembly 58, and rigidly supports the primary and secondary guide posts 80, 82 within the housing 22. In the illustrated embodiment, the frame 112 has a first portion positioned within the head portion 26 of the housing 22 and a second portion positioned within the handle portion 30. The construction of the frame 112 allows the firing mechanism 62 and the drive mechanism 46 to be assembled separately (e.g., as shown in FIG. 3) and inserted within the housing 22. As a result, this allows for a more compact arrangement of the firing mechanism 62 and the drive mechanism 46, which reduces the overall size of the driver 10.

Now with reference to FIG. 2, the powered fastener driver 10 includes a length L defined between a front end of driver 10 (e.g., a front end of the contact trip 20) and a rear end of the housing 22 (e.g., the head portion 26). The length L of the driver 10 is less than or equal to 18 centimeters. In the illustrated embodiment, the length L is 16.5 centimeters. In some embodiments, the length L may be in a range from 12.5 centimeters to 18 centimeters. In some embodiments, the length L may be in a range from 12.5 centimeters to 16.5 centimeters.

Figure 5:
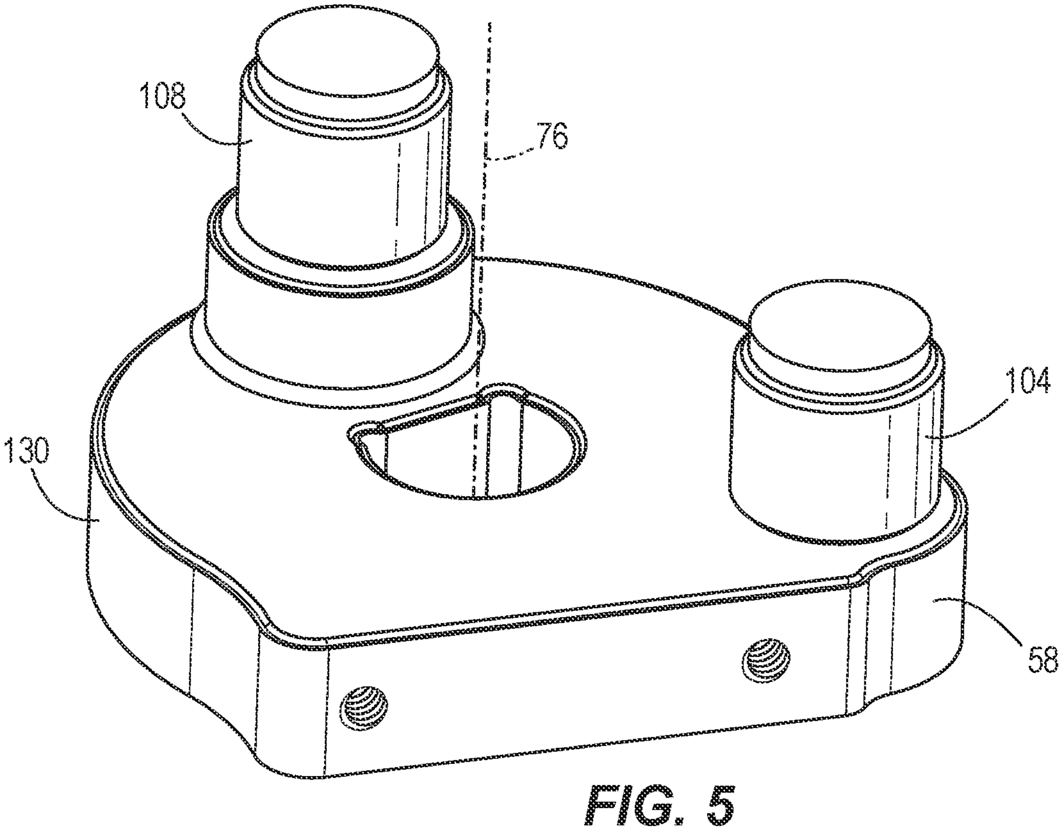
FIG. 5 is a perspective view of the portion of the lifter assembly shown in FIG. 4.
Figure 6:
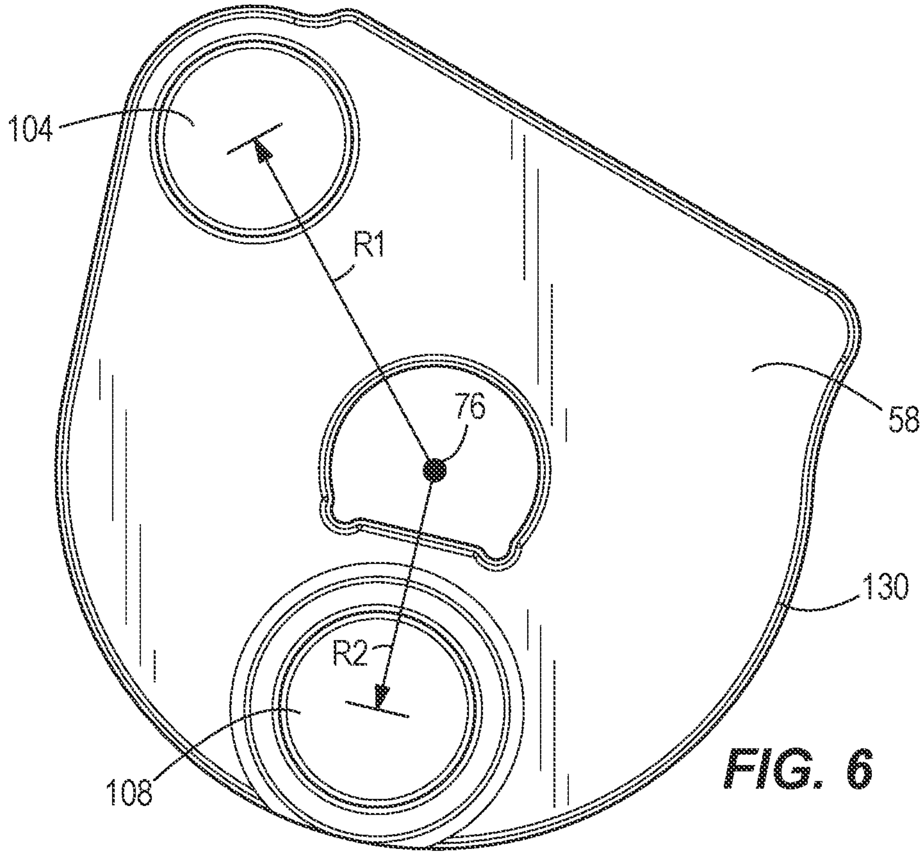
FIG. 6 is a top view of the portion of the lifter assembly shown in FIG. 4.

Now with reference to FIGS. 5 and 6, the lifter assembly 58 includes an outer circumferential surface 130. Each of the eccentric pins 104, 108 are arranged proximate the outer circumferential surface 130. In addition, the first eccentric pin 104 is positioned at a first radial distance R1 relative to a rotational axis of the lifter assembly 58 (i.e., the motor axis 76). The second eccentric pin 108 is positioned at a second radial distance R2 that is less than the first radial distance R1 of the first eccentric drive pin 104. As such, the eccentric pins 104, 108 of the lifter assembly 58 are positioned at different radial distances R1, R2 relative to the axis 76. In other words, the eccentric pins 104, 108 are radially offset with respect to each other.

Now with reference to FIG. 2, when the piston 66 is moved from the bottom-dead-center (BDC) position to the top-dead-center (TDC) position, the lifter assembly 58 rotates so the second eccentric pin 108 engages the second protrusion 102 of the bracket 86 of the piston 66. Because the second eccentric pin 108 is positioned at the smaller, second radial distance R2 than the first eccentric pin 104, less reaction torque is applied on the motor 50 by the spring 70 when the piston 66 is stationary in the ready position between the BDC and TDC positions. Additionally, because the first eccentric pin 104 is shorter than the second eccentric pin 108, during rotation of the lifter assembly 58, only the second eccentric pin 108 is capable of engaging the second protrusion 102. In other words, the first eccentric pin 104 has a first height and the second eccentric pin has a second height that is larger than the first height.

For example, the lifter assembly 58 is driven to rotate in a first direction by the drive mechanism 46 so the first and second eccentric pins 104, 108 engage the first and second protrusions 98, 102 in sequence, which returns the piston 66 and the driver blade 74 from the BDC position toward the TDC position. Since the radius R2 of the second eccentric pin 108 is smaller than the radius R1 of the first eccentric pin 104, the second eccentric pin 108 has a lower linear velocity than the linear velocity of the first eccentric pin 104 when the lifter assembly 58 is rotated by the motor 50. As a result, the higher linear velocity of the first eccentric pin 104 increases firing speeds by returning the piston 66 to the TDC position faster while the lower linear velocity of the second eccentric pin 108 reduces the reaction torque on the motor 50.

In operation, at the conclusion of a first drive cycle, the motor 50 rotates the output shaft 56, and therefore the lifter assembly 58, about a motor axis 76 to drive the piston 66 and the driver blade 74 toward the TDC position, compressing the biasing member 70. Prior to reaching the TDC position, the motor 50 is deactivated and the piston 66 and the driver blade 74 are held in a ready position, which is located between the TDC and the BDC positions, concluding a first drive cycle. When trigger 42 is actuated to initiate a subsequent, second drive cycle, the lifter assembly 58 is again rotated by the motor 50, which releases the biasing member 70 and drives the piston 66 and the driver blade 74 toward the BDC position, which causes the driver blade 74 to move about a drive axis 78 and thereby driving the fastener 12 into the workpiece. Following the release of the biasing member 70, the lifter assembly 58 returns the piston 66 towards the TDC position in preparation for another subsequent drive cycle.

Figure 7:
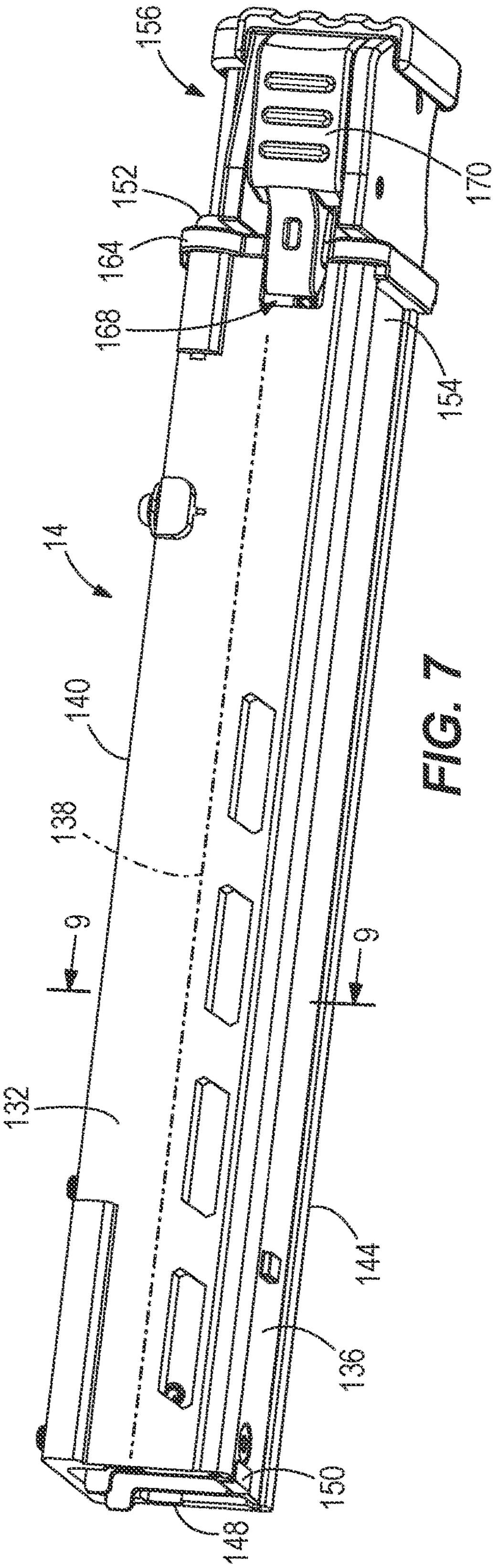
FIG. 7 is a perspective view of a magazine of the powered fastener driver of FIG. 1, illustrating the magazine in a closed position.
Figure 8:
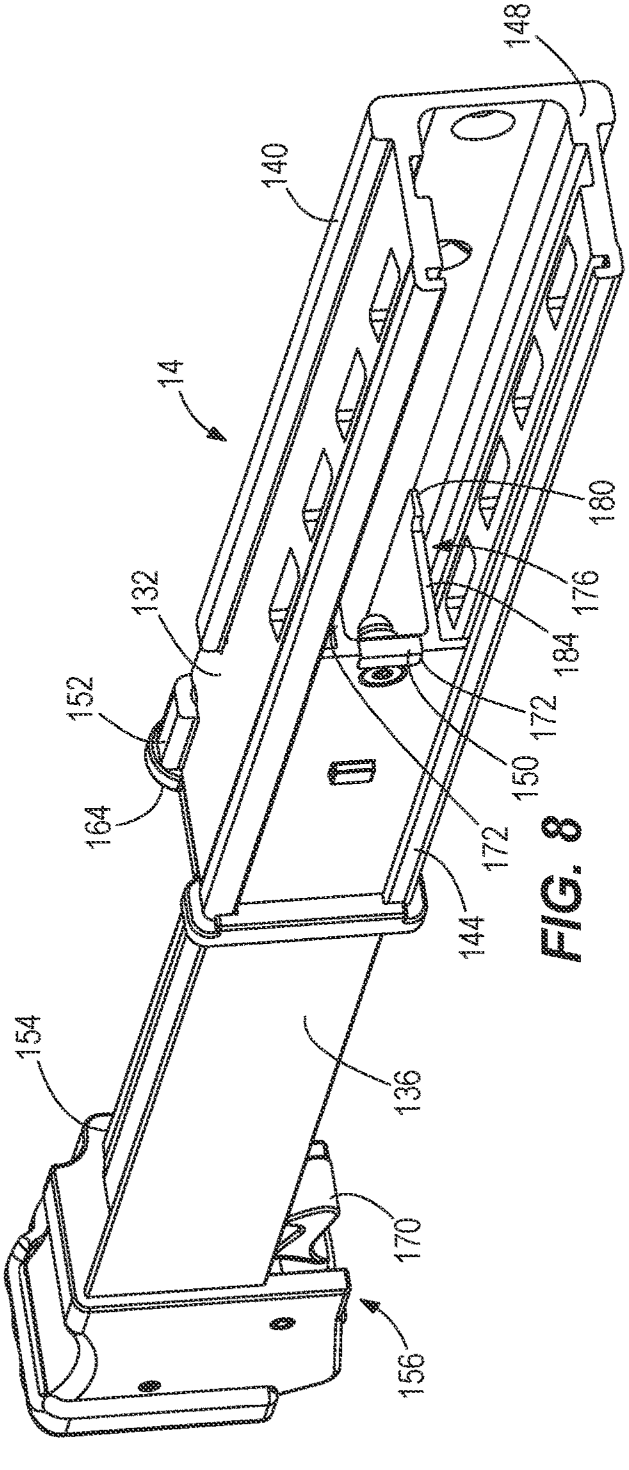
FIG. 8 is another perspective view of the magazine of FIG. 7, illustrating the magazine in an open position.

Now with reference to FIGS. 7-11, the magazine 14 includes an outer magazine cover 132 and an inner magazine body 136 received within the outer magazine cover 132. The inner magazine body 136 is slidable relative to the outer magazine cover 132 between a first, closed position (FIG. 7), and a second, open position (FIG. 8). The magazine 14 includes a top surface 140, which is secured to the driver (FIG. 1), and a bottom surface 144 that engages the workpiece and is opposite the top surface 140. The outer magazine cover 132 includes a first, front portion 148 adjacent the nosepiece 18 (FIG. 1), and a second, rear portion 152 adjacent the battery receptacle 34. The inner magazine body 136 includes a front portion 150 and a rear portion 154 opposite the front portion 148. For example, when the magazine 14 is in the closed position, the inner magazine body 136 is positioned entirely within an interior cavity defined by the outer magazine cover 132 so the front portion 150 and the rear portion 154 of the inner magazine body 136 respectively aligns with the front portion 148 and the rear portion 152 of the outer magazine cover 132. The magazine 14, therefore, has a length extending along a longitudinal axis 138 between the front and rear portions 148, 152 of the outer magazine cover 132. When the inner magazine body 136 is moved towards the open position, the inner magazine body 136 slides (to the right from the reference of frame of FIG. 7 and to the left from the frame of reference of FIG. 8) until the front portion 150 of the inner magazine body 136 is positioned proximate the rear portion 152 of the outer magazine cover 132. The magazine 14 has a length extending along the longitudinal axis 138 between the front portion 148 of the outer magazine cover 132 and a rear portion 154 of the inner magazine body 136.

A lock assembly 156 is positioned at the rear portion 152 of the inner magazine body 136. The lock assembly 156 includes a flange portion 160 (FIG. 11) positioned within the inner magazine body 136, which secures the lock assembly 156 to the inner magazine body 136. The lock assembly 156 is configured to selectively couple the inner magazine body 136 to the outer magazine cover 132 to maintain the inner magazine body 136 in the closed position. In the illustrated embodiment, a latching bracket 164 is coupled to the outer magazine cover 132 adjacent the rear portion 152 of the magazine 14 and a latching recess 168 (FIG. 10) is formed in a side surface of the outer magazine cover 132.

The lock assembly 156 includes a latch member 170 that selectively engages the latching bracket 164 and is seated within the latching recess 168 when the outer magazine cover is in the closed position (FIG. 7). In the illustrated embodiment, the latch member 170 is biased (e.g., via a spring) towards a closed or latched position. In order to move the inner magazine body 136 towards the open position, the latch member 170 is actuated, releasing the latching bracket 164 to permit the inner magazine body 136 to be extended from the outer magazine cover 132 towards the open position (FIG. 8). In the open position, the operator may load fasteners into the magazine 14.

Figure 9:
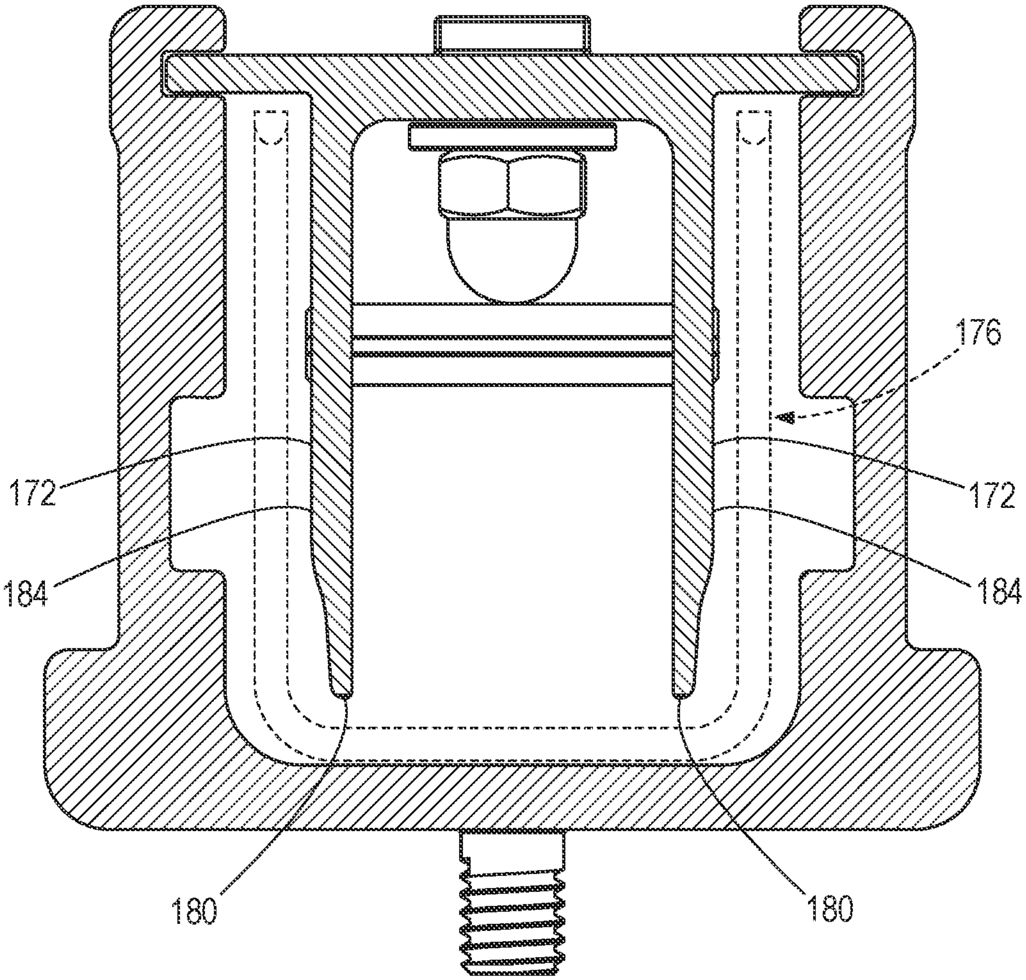
FIG. 9 is a cross-sectional view of the magazine of FIG. 7 along section line 7-7 in FIG. 7.
Figure 10:
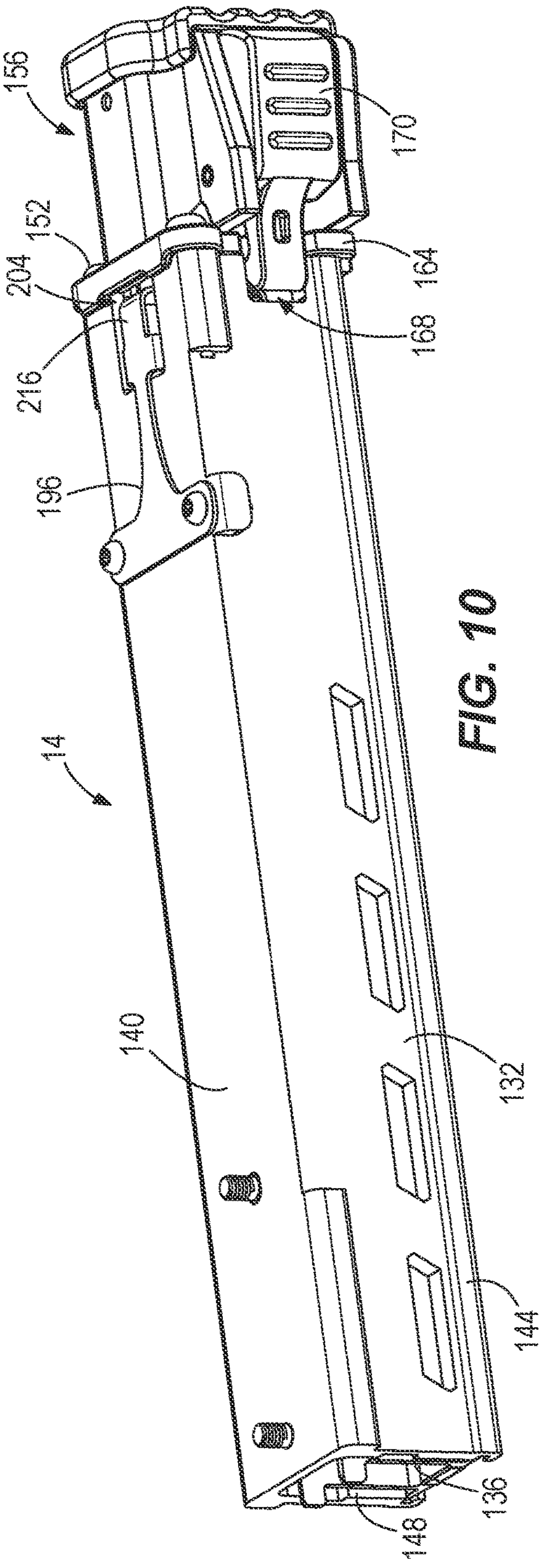
FIG. 10 is another perspective view of the magazine of FIG. 7, illustrating a pusher latch.

With reference to FIGS. 8 and 9, the inner magazine body 136 includes an extruded rail 172 defining the fastener channel 176 in which the staples 12 are received (FIG. 1). In the illustrated embodiment, the fastener channel 176 has a U-shape (represented by the broken lines in FIG. 9) corresponding to the U-shape of the staples 12. In the illustrated embodiment, the rail 172 is formed as two separate extrusions that define an edge portion 180 and two opposed sidewalls 184 adjacent the edge portion 180. Each of the staples 12 is configured to straddle the edge portion 180 and the sidewalls 184 of the rail 172 when the staples 12 are received in the fastener channel 176. In other embodiments, the extruded rail 172 may be formed as a single extruded structure. The outer magazine cover 132 further includes a pair of side surfaces 182 and a slot 186 recessed in the side surfaces 182. The slot 186 receives the inner magazine body 136 so the inner magazine body 136 can slide relative to the outer magazine cover 132.

Figure 11:
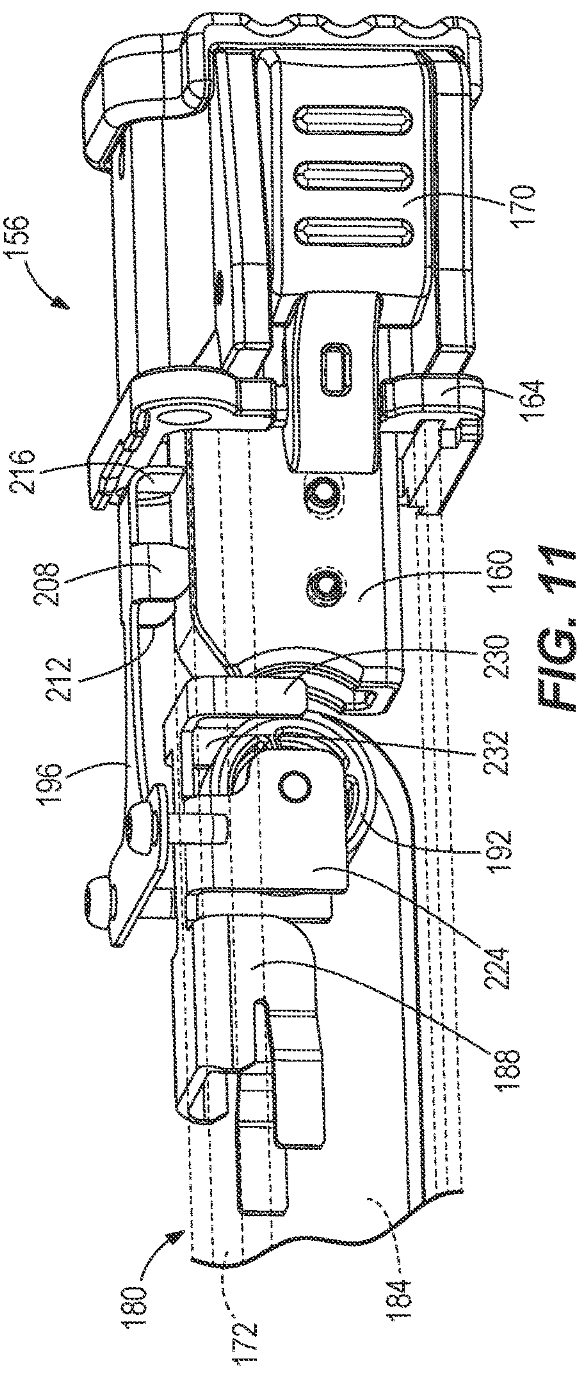
FIG. 11 is another perspective view the magazine of FIG. 7, with a portion of the magazine removed for clarity to illustrate the pusher latch and a pusher body.
Figure 12:
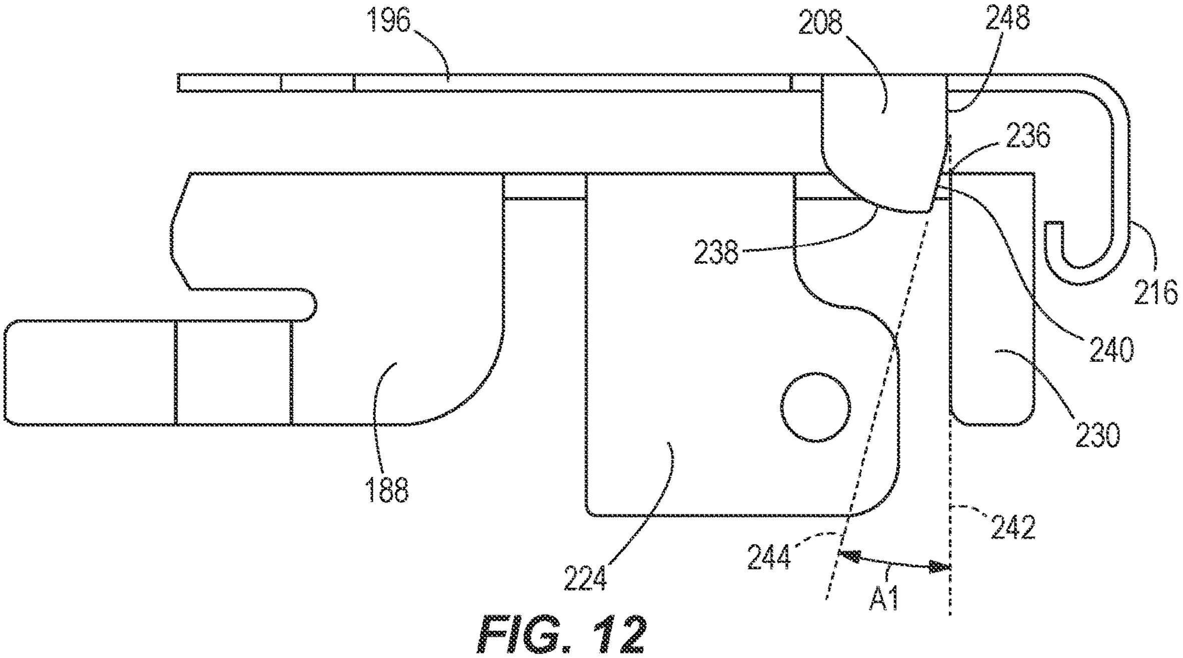
FIG. 12 is a side view of the pusher latch and pusher body.
Figure 13:
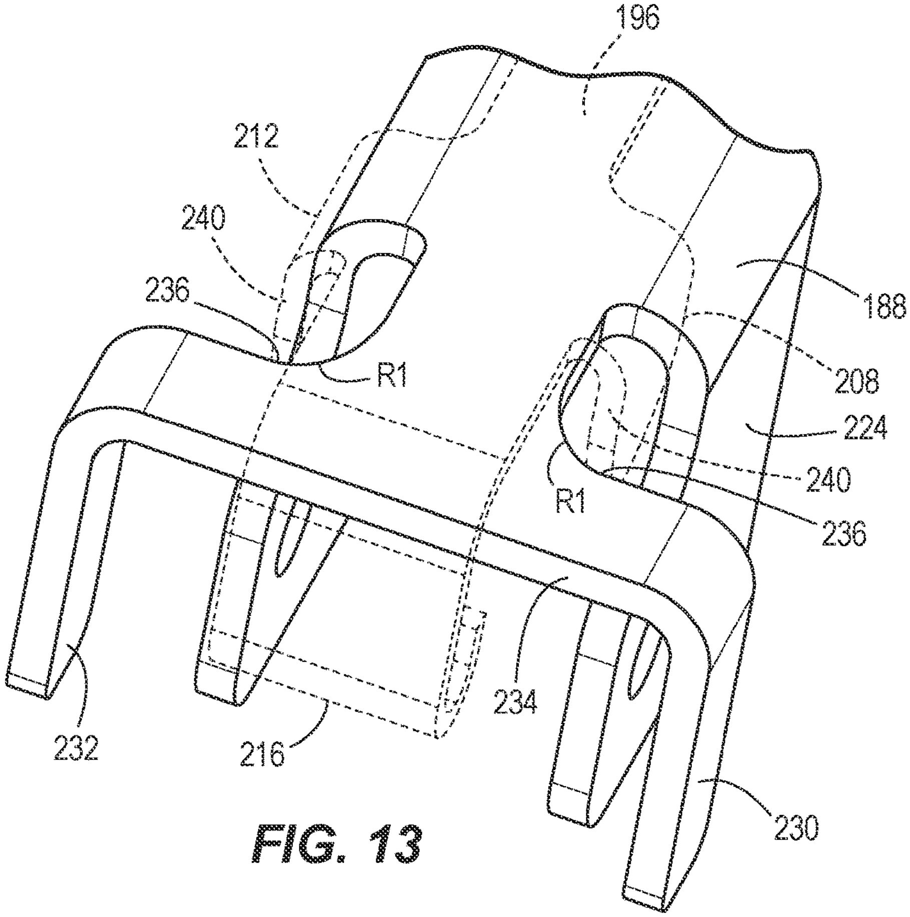
FIG. 13 is a top perspective view of the pusher latch and pusher body of FIG. 12.
Figure 14:
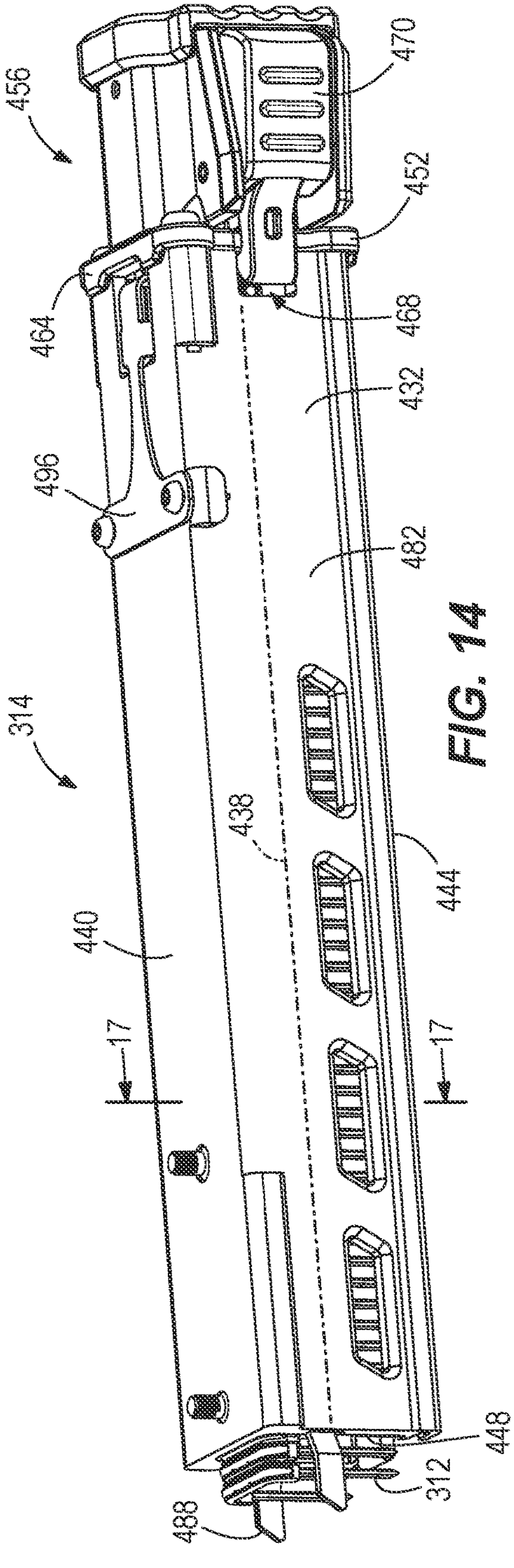
FIG. 14 is a top perspective view of another embodiment of a magazine for use with the powered fastener driver of FIG. 1, illustrating the magazine in a closed position.

Now with reference to FIGS. 11-13, the magazine 14 further includes a pusher body 188 (FIGS. 12, and 13) positioned within the fastener channel 176 of the magazine 14 and a latch 196 (FIG. 11) coupled to the top surface 140 of the outer magazine cover 132. The pusher body 188 is slidably coupled to the magazine 14 and biases the collated fastener strip toward the front portion 148 of the magazine 14. In the illustrated embodiment, the magazine 14 includes a biasing member (e.g., roll coil spring 192; FIG. 12) configured to bias the pusher body 188 toward the front portion 148 of the magazine 14 (i.e., toward the nosepiece 18).

The latch 196 includes a latch projection 216 that is received within an opening 204 defined in the top surface 140 of the outer magazine cover 132 and first and second projections 208, 212 oriented on each side of the latch 196. The latch projection 216 is biased inward toward the flange portion 160 of the lock assembly 156 (e.g., downward from the frame of reference of FIG. 10) through the opening 204. The latch projections 216 each define a contact surface 240. The contact surface 240 defines a first plane 244 oriented at an oblique angle A1 relative to a vertical reference plane 242 that is perpendicular to the longitudinal axis 138 of the magazine 14. The opposing side of arms 208, 212 define arcuate segments 238 opposing the contact surface 240. In the illustrated embodiment, the angle A1 is an acute angle (e.g., less than 90 degrees). In some embodiments, the angle A1 is in a range from 10 degrees to 30 degrees. In some embodiments, the angle A1 is approximately 15 degrees.

The pusher body 188 that is configured to straddle the edge portion 180 and the sidewalls 184 of the rail 172. The pusher body 220 defines a main body 224 that supports the biasing member 192 and first and second arm members 230, 232. Each arm member 230, 232 includes a contact surface 236 (FIG. 13) configured to contact the contact surface 240 (FIGS. 12 and 13) of the first and second projections 208, 212, respectively, of the latch 196. The pusher body 220 is selectively engageable with the latch 196 for maintaining the pusher body 220 in a latched position (e.g., for loading). In the illustrated embodiment, the contact surfaces 236 are each curvilinear and include a constant radius R1. As a result, a single line of contact (e.g., extending along the longitudinal axis 138 of the magazine 14) is formed between the contact surface 236 of the pusher body 188 (e.g., at the radius R1) and the contact surface 240 of the latch 196.

When the magazine 14 is moved towards a closed position, the pusher body 188 is automatically adjusted from the latched position to a released position by engagement between the flange portion 160 of the lock assembly 156 and the latch projection 216 of the latch 196 when the inner magazine body 136 is slid toward the closed position. For example, the translation of the flange portion 160 in the closing direction of the inner magazine body 136 causes the latch projection 216 to slide upward along an inclined face of the flange portion 160, which deflects the latch 196 upward (e.g. from the frame of reference of FIGS. 10 and 12). As a result, the contact surface 240 of the latch 196 is moved above the contact surface 236 of the pusher body 188, which releases the pusher body 188 to bias the collated strip of staples towards the nosepiece 18.

When the magazine is moved towards an open position, the user releases the lock assembly 156 and slides the inner magazine body 136 (FIG. 8) and the pusher body 188 relative to the outer magazine cover 132. The movement of the pusher body 188 causes the arcuate members 238 (FIG. 12) of the first and second arm members 230, 232 of the latch 196 to engage with the arm members 208, 212 of the pusher body 188, which causes the latch 196 to deflect upwards (with reference to FIG. 12) so the arm members 208, 212 of the latch 196 move beyond (e.g., underneath) the arm members 208, 212 of the pusher body 188. Once the arm members 208, 212 of the latch 196 are beyond the arm members 230, 232 of the pusher body 188, the latch 196 is urged towards the position shown in FIG. 12 (e.g. so the contact surfaces 236, 240 are adjacent each other). Once the user releases the inner magazine body 136, the biasing member 192 urges the pusher body 188 forward (e.g., towards the front portion 148 of the outer magazine cover 132), which causes the contact surface 236 of each arm member 230, 232 of the pusher body 188 to engage the contact surface 240 of the latch 196. Thereby, the pusher body 188 is maintained in the latched position against the bias of the biasing member 192. The user may now load fasteners into the fastener channel 176 of the magazine 14 in front of the pusher body 188. The user may then load the collated strip of staples 12 in the magazine 14 in front of the pusher body 188. To adjust the pusher body 188 from the latched state into the normal operating state, the user pushes the inner magazine body 136 towards the closed position (FIG. 7), which disengages the engagement between the contact surfaces 236, 240 as described above. As a result, the pusher body 188 is released and biases the collated strip of staples 12 towards the nosepiece 18.

FIGS. 14-17 illustrate a magazine 314 according to another embodiment of the invention. The magazine 314 is like the magazine 14 shown in FIG. 7-11 and described above. Therefore, like features are identified with like reference numerals plus "300", and only the differences between the two will be discussed.

Figure 15:
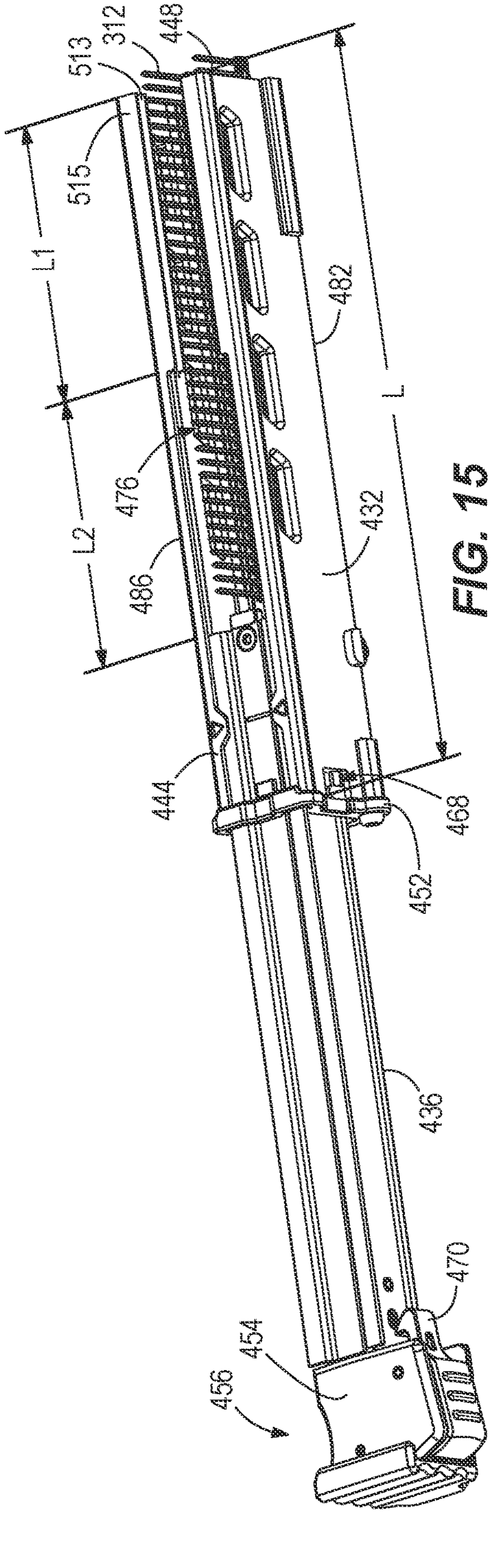
FIG. 15 is a bottom perspective view of the magazine of FIG. 14, illustrating the magazine in an open position.

The magazine 314 includes an outer magazine cover 432 and an inner magazine body 436 received within and slidable relative to the outer magazine cover 432 between a first closed position (FIG. 14) and a second, open position (FIG. 15). The outer magazine cover 432 includes a first, front end 448 adjacent the nosepiece 18 (FIG. 1), a second, rear end 452 adjacent the battery receptacle 34 (FIG. 1), and a length L extending along a longitudinal axis 438 between the front end 448 and the rear end 452. A lock assembly 456 is positioned at a rear end 454 of the inner magazine body 436 to selectively couple the inner magazine body 436 to the outer magazine cover 432 to maintain the inner magazine body 436 in the closed position. The magazine 314 further includes a pusher body 488 (FIG. 14) positioned within a fastener channel 476 (FIG. 17) of the magazine 314 and a latch 496 (FIG. 14) coupled to a top wall 440 of the outer magazine cover 432. The pusher body 488 is slidably coupled to the magazine body 436 and biases one or more collated fastener strips 312 toward the front end 448 of the magazine cover 432. The outer magazine cover 432 further includes a pair of parallel side walls 482 extending from opposite sides of the top wall 440 and a slot 486 within each of the side walls 482 in which the inner magazine body 436 is received so the inner magazine body 436 can slide relative to the outer magazine cover 432.

Figure 16:
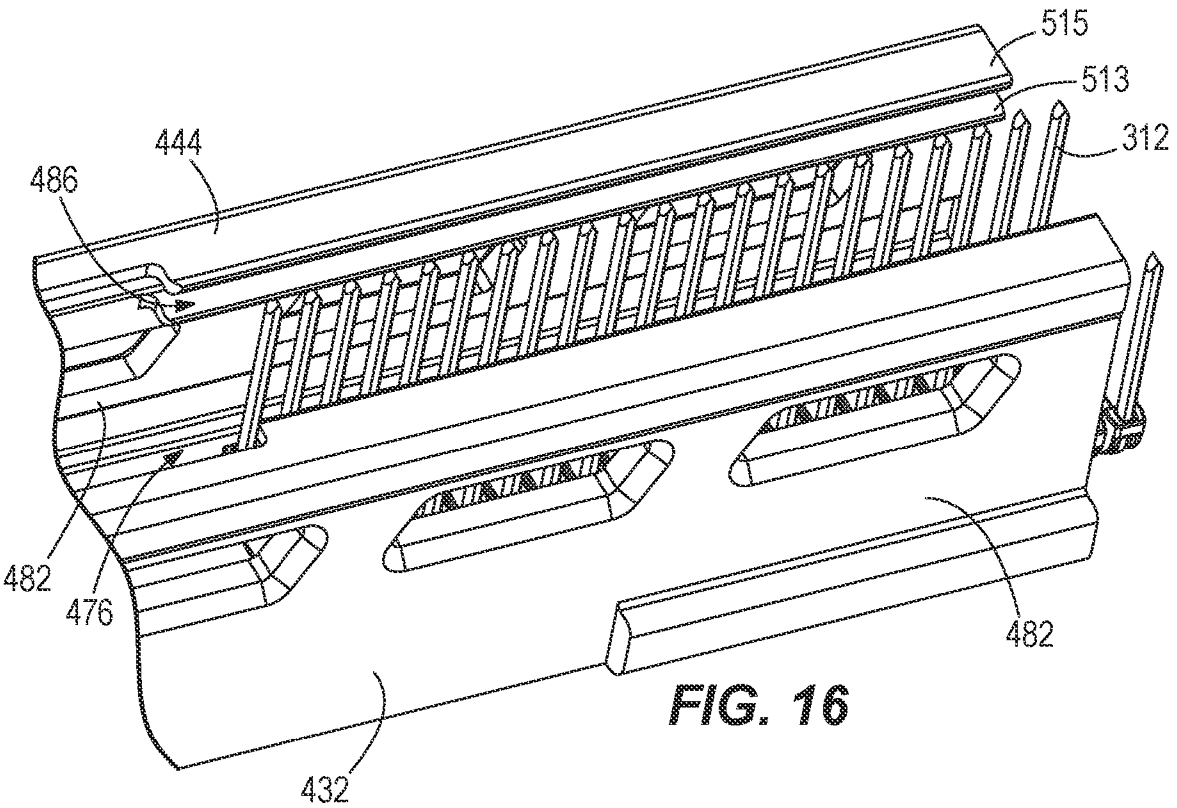
FIG. 16 is an enlarged, bottom perspective view of the magazine of FIG. 15.
Figure 17:
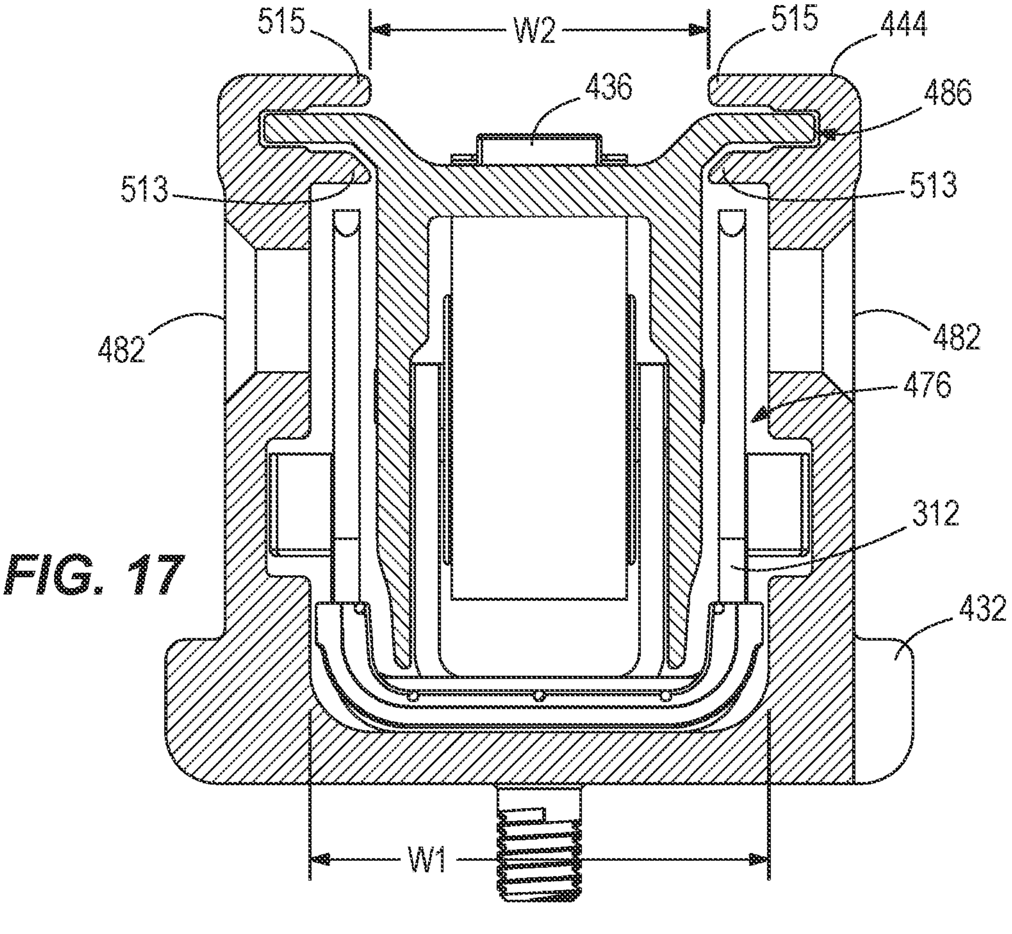
FIG. 17 is a cross-sectional view of the magazine of FIG. through section 16-16 in FIG. 14.

Now with reference to FIGS. 15-17, the outer magazine cover 432 includes an internal rib 513 and an external rib 515, which each extending inward from each of the side walls 482 of the outer magazine cover 432. The internal and external ribs 513, 515 are parallel and vertically spaced on each side of the slot 486 (FIG. 17). In the illustrated embodiment, the internal rib 513 and the external rib 515 each extend a length L1 (FIG. 15) of the outer magazine cover 432, which is a portion of the total length L of the outer magazine cover 432. The fastener channel 476 defines a width W1 that is sized receive the collated fastener strips 312 and the internal and external ribs 513, 515 define a gap therebetween having a width W2 that is less than the width W1 of the fastener channel 476 (FIG. 17). Therefore, the internal and external ribs 513, 515 reduce the width W2 of the opening formed at the bottom of the outer magazine cover 432 to restrict the collated fastener strips 312 from being removed from and/or installed into the fastener channel 476. In some embodiments of the magazine 314, the length L1 of the internal and external ribs 513, 515 may be equal to or greater than a length of a single collated fastener strip 312 to restrict removal of the collated fastener strip 312 when located within the length L1 of the magazine cover 432.

In the illustrated embodiment, the lengths L1 of the internal and external ribs 513, 515 are approximately equal. In other embodiments, the length of the external ribs 515 may be greater than or less than the length of the internal ribs 513. In other embodiments, the outer magazine cover 432 may only include one of either the internal ribs 513 or the outer ribs 515. While the illustrated internal and external ribs 513, 515 are continuous structures, it should be appreciated that the ribs may alternatively be segmented or discontinuous structures.

A second length L2 of the outer magazine cover 432 is devoid of the internal and external ribs 513, 515 and defines an installation region where the collation fastener strips 312 can be individually inserted when the magazine body 436 is in the open position (FIG. 15). The length L2 may be equal to or greater than the length of a single collated fastener strip 312, which requires the magazine body 436 to be fully retracted to its open position, thereby securing the pusher body 488 to the latch 496 as described above, prior to installation of a new collated fastener strip 312.

When the collated fastener strips 312 are inserted within the magazine 314, a first collated fastener strip 312 is inserted within the installation region of the outer magazine cover 432 and moved towards the front end 448 of the outer magazine cover 432. A second collated fastener strip 312 is then inserted within the installation region of the outer magazine cover 432. The inner magazine body 436 is moved towards the closed position (FIG. 14), which releases the pusher body 488 and biases the collated fastener strips 312 towards the nosepiece 18. As the pusher body 488 biases the collated fastener strips 312, the internal ribs 513 supports the tips of the collated fastener strips 312. The inner ribs 513 prevent the adjacent strips 312 from buckling, ensures proper alignment of the fastener strips 312 within the magazine 314, and supports the tips of the fastener strips 312 when the fasteners are sequentially fed from the magazine 14 into the nosepiece 18 (FIG. 1) prior to each fastener-driving operation.

Figure 18:
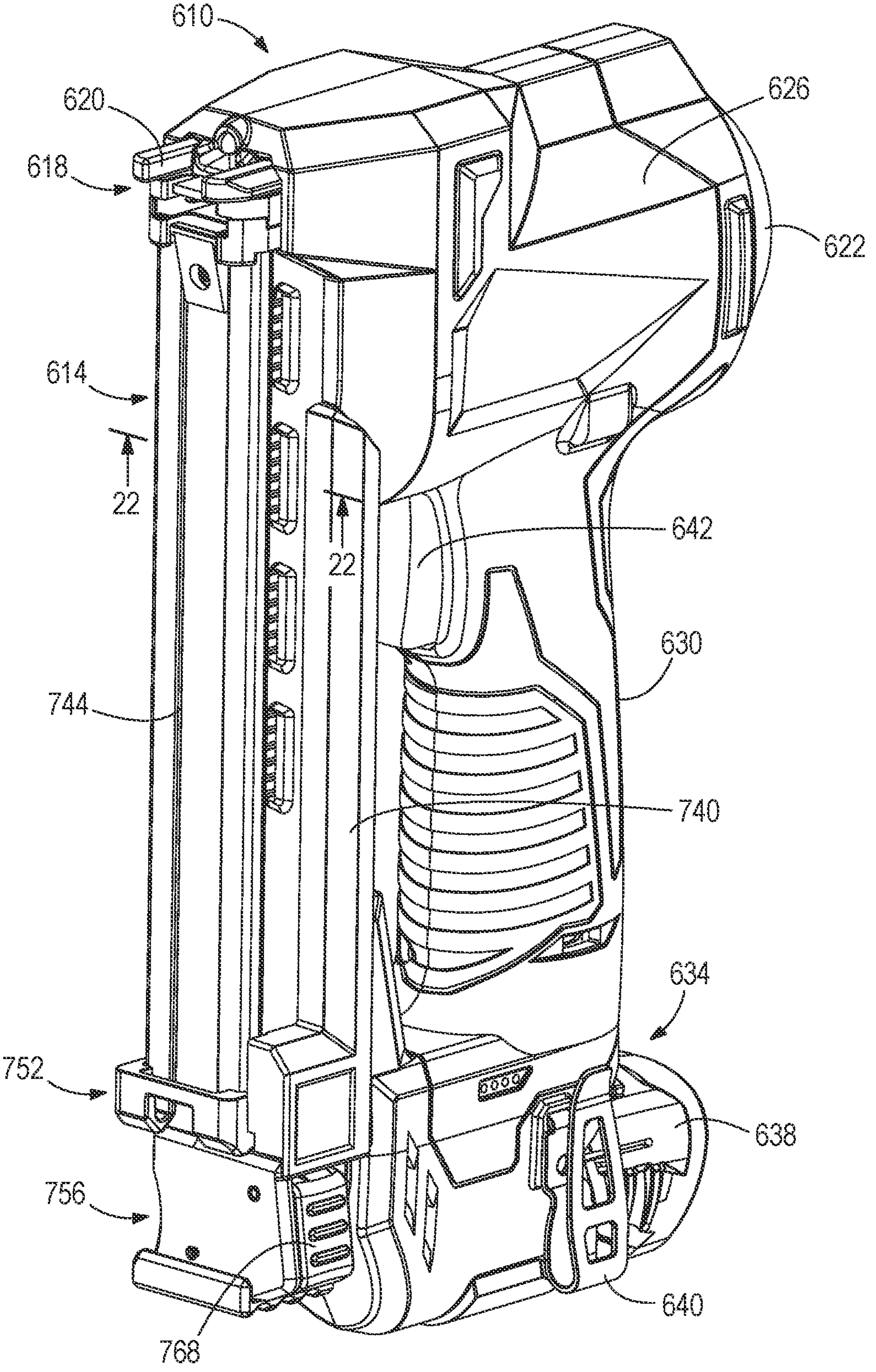
FIG. 18 is a bottom perspective view of a powered fastener driver including another embodiment of a magazine in a closed position.
Figure 19:
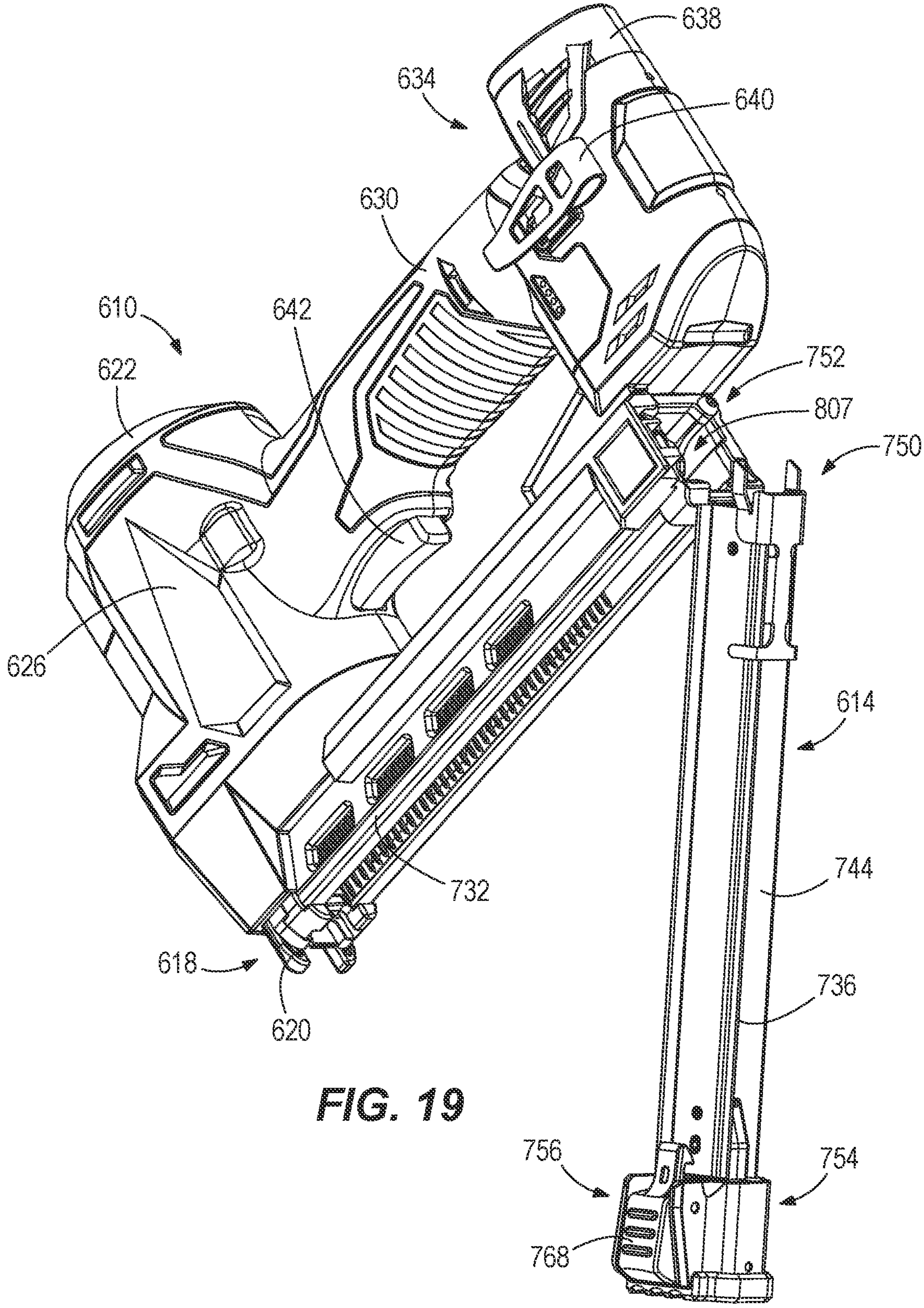
FIG. 19 is a bottom perspective view of the powered fastener driver of FIG. 18 with the magazine in an open position.
Figure 20:
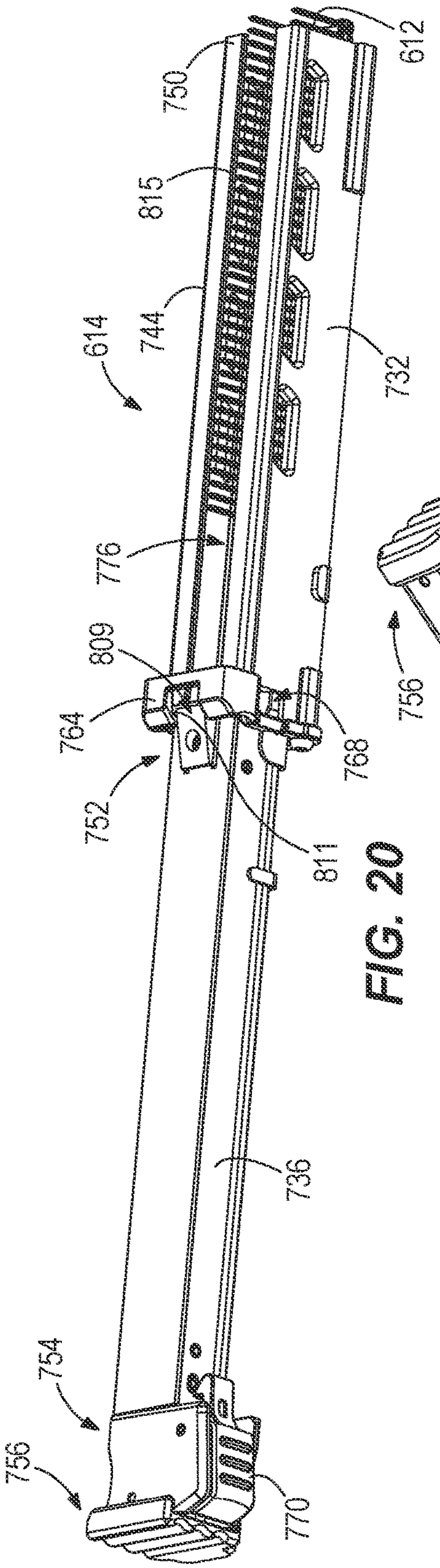
FIG. 20 is a bottom perspective view of the magazine of FIG. 18, illustrating the magazine in a partially open, intermediate position.
Figure 21:
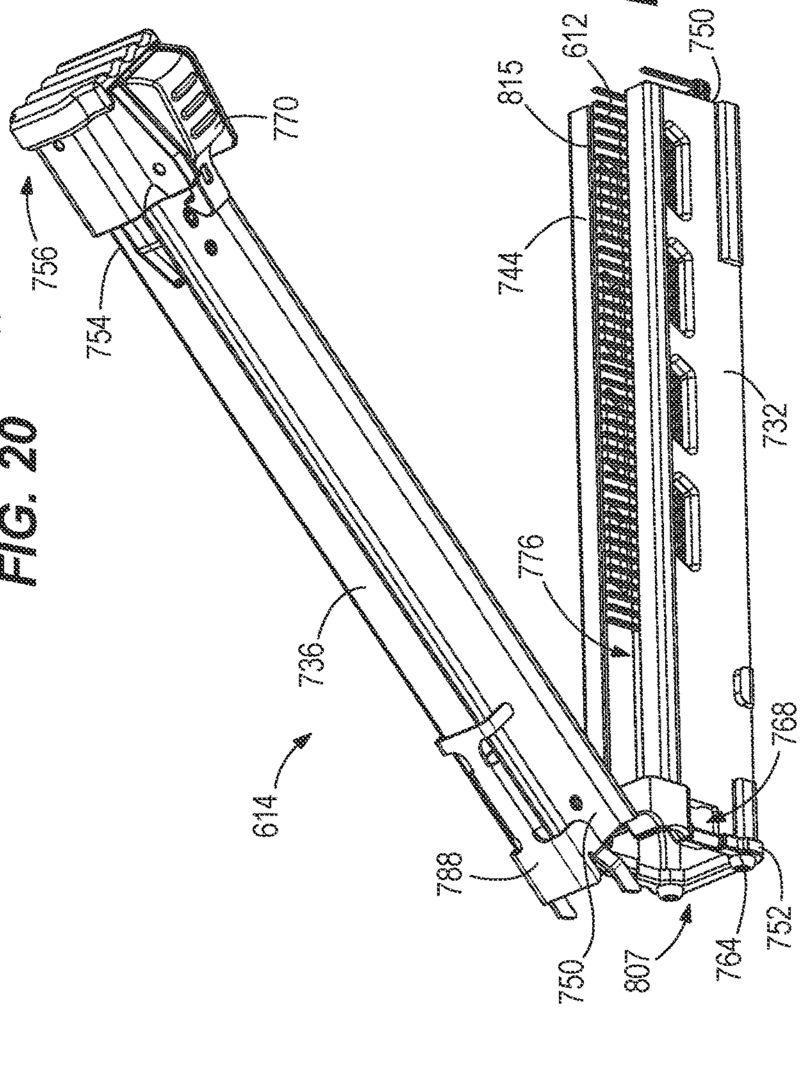
FIG. 21 is a bottom perspective view of the magazine of FIG. 18, illustrating the magazine in a fully open position.

FIGS. 18-22 illustrate a magazine 614 coupled to a powered fastener driver 610 (FIG. 18) according to another embodiment of the invention. The magazine 614 is like the magazine 14 shown in FIGS. 7-11 and described above and the powered fastener driver 610 is like the powered fastener driver 10 shown in FIGS. 1-6 and described above. Therefore, like features are identified with like reference numerals plus "600", and only the differences between the two will be discussed. The magazine 614 includes an outer magazine cover 732 and an inner magazine body 736 received within the outer magazine cover 732. The inner magazine body 736 is movable between a first closed position (FIG. 18), a second, intermediate position (FIG. 20), and a third, open position (FIGS. 19 and 21). The outer magazine cover 732 includes a first, front end 748 adjacent a nosepiece 618, second, rear end 752 adjacent the battery receptacle 634. The inner magazine body 736 includes a front end 750 and a rear end 754 opposite the front end 748. In the open position, collated fastener strips 312 can be inserted through an installation region 807 formed in the rear end 752 of the outer magazine cover 732. The magazine 614 further includes a pusher body 788 (FIG. 21) positioned within a fastener channel 776 of the magazine 614, which is slidably coupled to the magazine body 736 and biases collated fastener strips 612 toward a front end 748 of the magazine cover 732.

A lock assembly 756 is positioned at a rear end 754 of the inner magazine body 736 to selectively couple the inner magazine body 736 to the outer magazine cover 732 to maintain the inner magazine body 736 in the closed position (FIG. 18). The lock assembly 756 includes a latch member 770 that selectively engages the latching bracket 764 and is seated within the latching recess 768 when the outer magazine cover 732 is in the closed position (FIG. 18). The latching bracket 764 further defines a recess 809 that is sized to receive a protrusion 811 formed on the inner magazine body 736 when the magazine 614 is in the second, intermediate position (FIG. 20).

Figure 22:
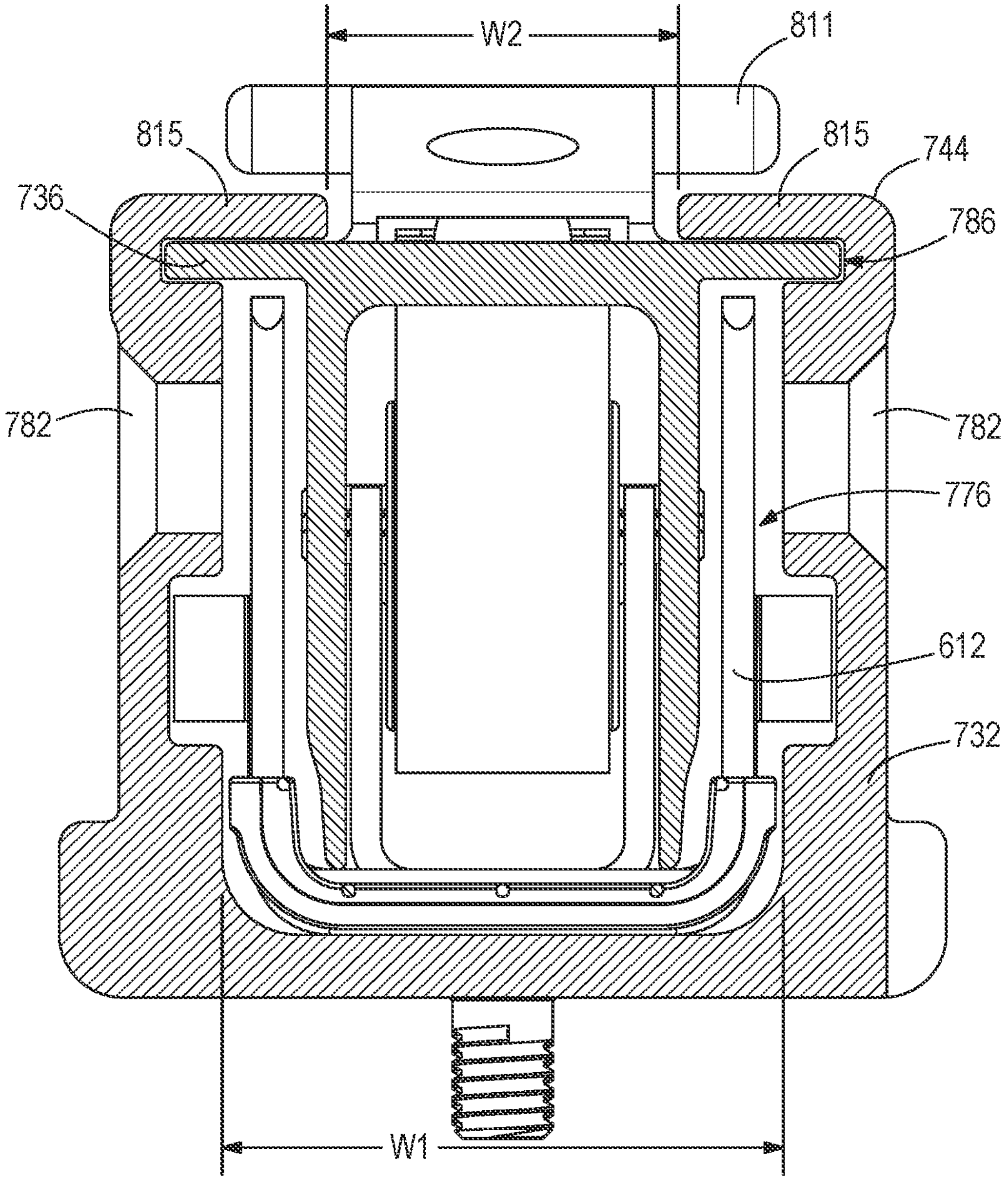
FIG. 22 is a cross-sectional view of the magazine of FIG. 18 through section 22-22 in FIG. 18.

Now with reference to FIGS. 20-22, the outer magazine cover 732 includes a rib 815 that extends inward from each of the side walls 782 of the outer magazine cover 732. The fastener channel 776 defines a width W1 (FIG. 22) that is sized receive the collated fastener strips 612 and the ribs 815 define a gap therebetween having a width W2 that is less than the width W1 of the fastener channel 776. Therefore, the ribs 815 prevent installation of the collated fastener strips 612 through the bottom of the outer magazine cover 732, thus requiring the collated fastener strips 612 to be installed through the installation region 807 at the rear end 752 of the magazine cover 732.

To insert a collated fastener strip 612 into the magazine 614, the latch member 770 of the lock assembly 756 is actuated to permit slidable movement of the inner magazine body 736 relative to the outer magazine cover 732. Once the inner magazine body 736 reaches the second, intermediate position (FIG. 20), the protrusion 811 on the inner magazine body 736 engages the recess 809 formed in the latching bracket 764 so the inner magazine body 736 can pivot relative to the outer magazine cover 732 towards the third, open position (FIG. 21). In the open position, the collated fastener strips 612 can be inserted within the magazine 614 through the installation region 807 formed in the rear end 752 of the outer magazine cover 732 and moved towards the front portion 748 of the outer magazine cover 732. Once the collated fastener strips 612 are inserted within the outer magazine cover 732, the inner magazine body 736 is pivoted back to the second, intermediate position and then is slidably moved towards the closed position (FIG. 18), which releases the pusher body 788 as described above and biases the collated fastener strips 612 towards the nosepiece 618.

Figure 23:
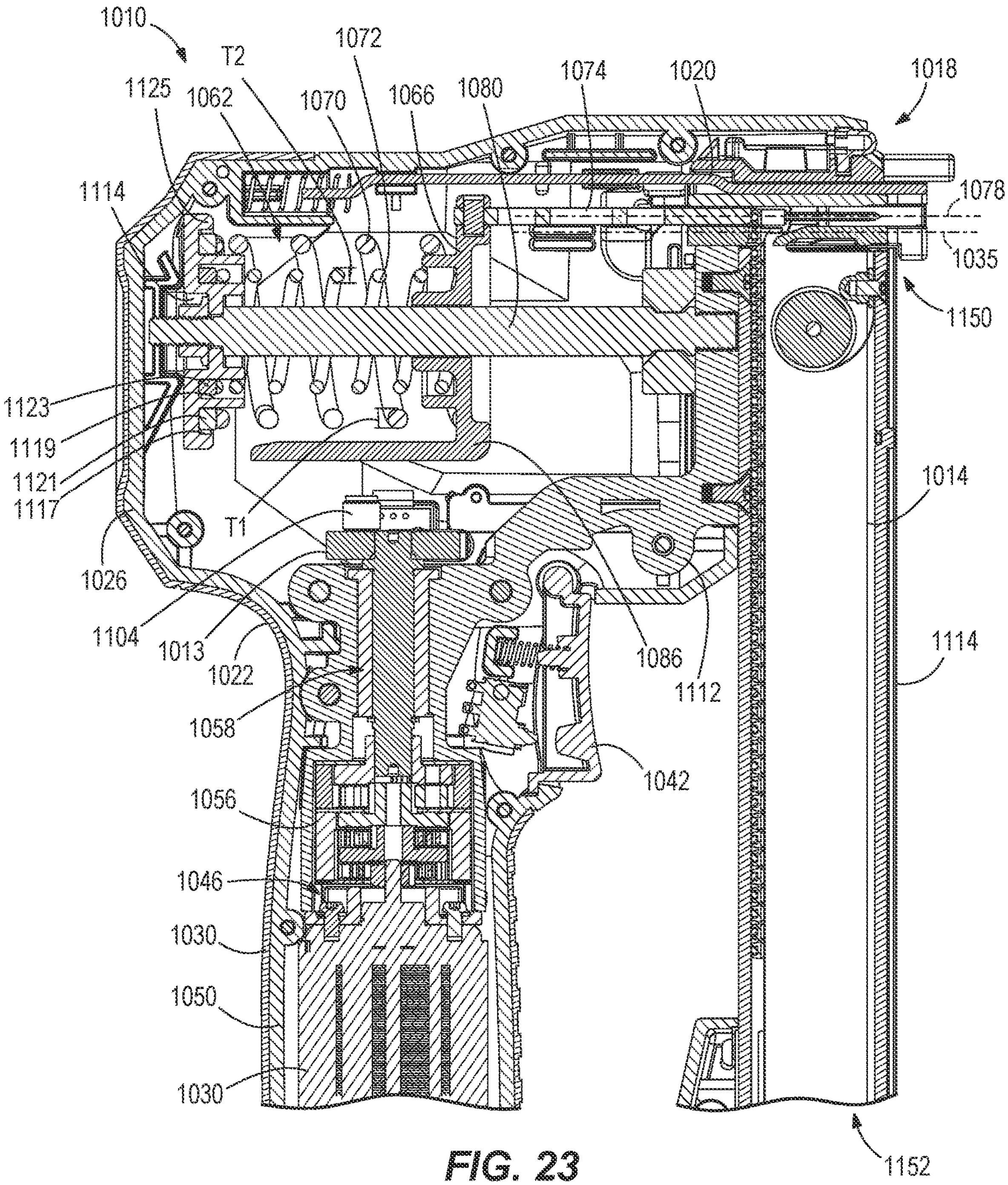
FIG. 23 is a cross-sectional view of a powered fastener driver according to another embodiment, illustrating a drive mechanism, a firing mechanism, and a lifter assembly.

FIG. 23 illustrates a power fastener driver 1010 according to another embodiment of the invention. The power fastener driver 1010 is like the power fastener driver 10 shown in FIG. 1-13 and described above. Therefore, like features are identified with like reference numerals plus "1000", and only the differences between the two will be discussed.

The powered fastener driver 1010 (e.g., a cable stapler) includes a magazine 1014 that holds fasteners 1012 (e.g., staples of a staple collation) and a nosepiece 1018 that sequentially receives the fasteners 1012 from the magazine 1014 prior to each fastener-driving operation. The driver 1010 includes a trigger 1042 that selectively activates a drive mechanism 1046 enclosed within a handle portion 1030 of the driver 1010. The drive mechanism 1046 includes an electric motor 1050 and a gear box 1054 that receives torque from the motor 1050. A lifter assembly 1058 is coupled to the drive mechanism 1046 and is positioned between the drive mechanism 1046 and a firing mechanism 1062.

The firing mechanism 1062 includes a movable member (e.g., a piston 1066) for reciprocal movement within the head portion 1026, a biasing member (e.g., a compression spring 1070) seated against the piston 1066, and a driver blade 1074 attached to the piston 1066. The biasing member 1070, 1072 urges the piston 1066 and the driver blade 1074 within the head portion 1026 towards a driven or bottom-dead center (BDC) position to drive the fastener 1012 into the workpiece.

The lifter assembly 1058 is operated by the drive mechanism 1046 to return the piston 1066 and the driver blade 1074 towards a top-dead center (TDC) position, against the bias of the biasing member 1070, 1072. In the illustrated embodiment, the biasing member includes a nested pair of compression springs 1070, 1072 that act in unison to urge the piston 1066 and the driver blade 1074 towards the BDC position. The compression springs 1070, 1072 include a first end supported within the piston 1066 and a second end supported within an end cap 1114. The end cap 1114 includes a first, outer recess 1117 and a second, inner recess 1119 that is surrounded by the first recess 1117. A first, outer washer 1121 is supported within the first recess 1117 formed in the end cap 1114. A second, inner washer 1123 is supported within the second recess 1119 formed in the end cap 1114. The end cap 1114 further includes an outer spring sleeve 1125 that retains the first washer 1123 within the end cap 1114. The first washer 1123 is positioned between the second end of the first compression spring 1070 and the end cap 1114. The second washer 1125 is positioned between the second end of the second compression spring 1072 and the end cap 1114. In the illustrated embodiment, the spring sleeve 1125 is formed of a metallic material (e.g., steel) and the washers 1121, 1123 are formed of a plastic material. The spring sleeve 1123 reduces deformation of the outer washer 1117 and helps maintain the shape of the washer 1117.

Further, the compression springs 1070, 1072 are formed of a metallic material such as 55CrSi. The first, outer compression spring 1070 has a first wire thickness T1 and the second, inner compression spring has a second wire thickness T2 that is less than the first wire thickness T1. The outer compression spring 1070 includes an outer nominal diameter of 40 millimeters, an uncompressed length of 93 millimeters, and a stiffness of 8.7 N/mm. In some embodiments, the outer nominal diameter of the outer compression spring 1070 may be in a range from 30 millimeters to 50 millimeters. In some embodiments, the stiffness of the outer compression spring 1070 may be in a range from 8.0 N/mm to 10 N/mm. The inner compression spring 1072 includes an outer nominal diameter of 25 mm, an uncompressed length of 93 millimeters, and a stiffness of 4.35 N/mm. In some embodiments, the outer nominal diameter of the inner compression spring 1072 may be in a range from 30 millimeters to 50 millimeters. In some embodiments, the stiffness of the inner compression spring 1072 may be in a range from 3.0 N/mm to 6.0 N/mm. In some embodiments, the uncompressed length of the inner and outer compression springs 1070, 1072 may be in a range from 70 millimeters to 110 millimeters.

Figure 25:
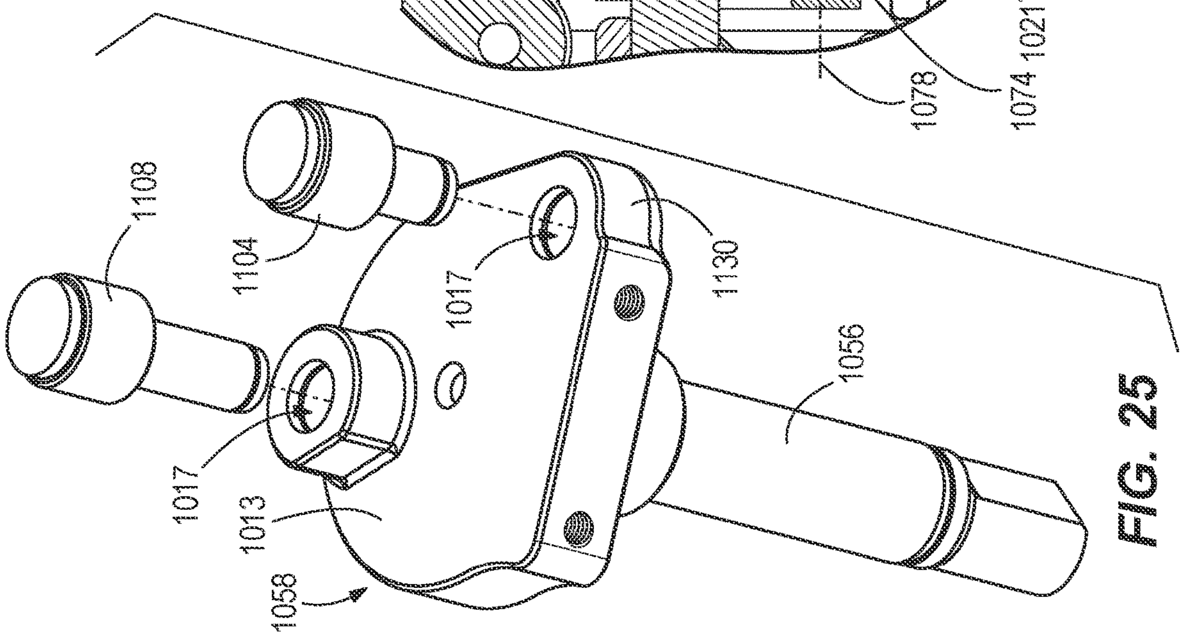
FIG. 25 is a perspective view of the lifter assembly of the power fastener driver of FIG. 23.

As shown in FIG. 25, the lifter assembly 1058 is formed as a unitary body having an input shaft 1056, which may also be considered an output shaft of the gear box 1054, and a hub 1013 that selectively engages a portion of the firing mechanism 1062 to return the piston 1066 and the driver blade 1074 towards the TDC position. In the TDC position, the compression springs 1070, 1072 store at least 14.5 Joules (J) of potential energy, which provides sufficient energy to fully seat fasteners into a workpiece. The fastener driver 1010 is able to store at least 14.5 J of potential energy, with an overall length L defined between a front end of driver 1010 (e.g., a front end of the contact trip 1020) and a rear end of the housing 1022 (e.g., the head portion 1026) of 18 centimeters or less, and in some embodiments 16.5 centimeters or less, because of the nested springs 1070, 1072 acting on the piston 1066. By nesting dual springs 1070, 1072 having different stiffnesses, more potential energy can be stored in the driver 1010 compared to a single spring within the same spatial confines. In other words, to achieve an equivalent potential energy with a single compression spring, such a spring would necessarily require a longer uncompressed length to accommodate a greater amount of compression, which then requires the driver to have a greater overall length (i.e., greater than 18 centimeters). With an overall length of 18 centimeters or less, the driver 1010 can be used in more confined spaces compared to prior art fastener drivers with an overall length of greater than 18 centimeters.

Figure 24:
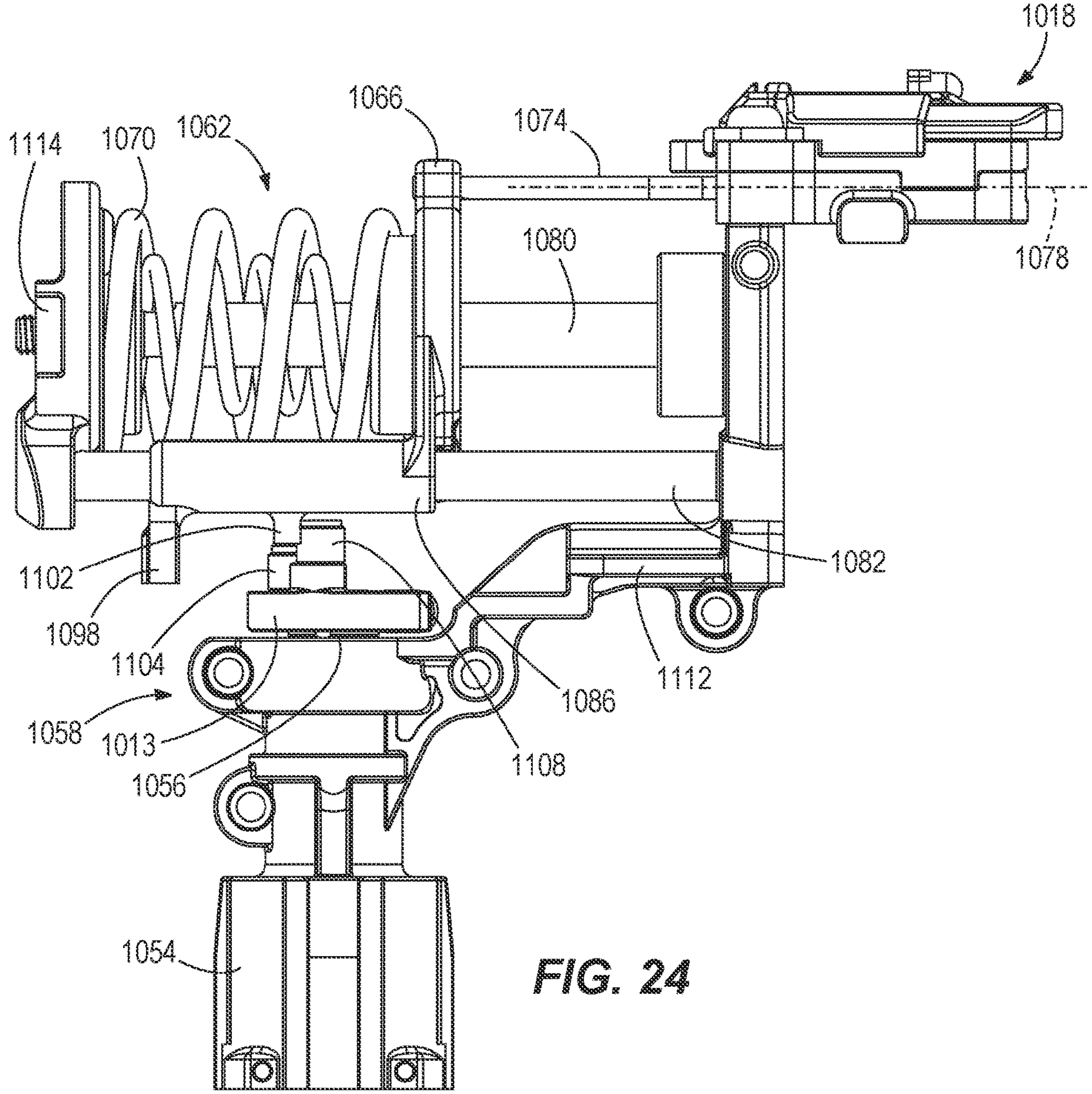
FIG. 24 is a side view of the drive mechanism, the firing mechanism, and the lifter assembly of the powered fastener driver of FIG. 23.

For example, the hub 1013 may include eccentric pins 1104, 1008 that engage respective first and second protrusions 1098, 1102 (FIG. 24) of the firing mechanism, which return the piston 1066 and the driver blade 1074 from the BDC position toward the TDC position. In the illustrated embodiment, the eccentric pins 1104, 1108 are secured within recesses 1017 (FIG. 25) formed in the hub 1013 of the lifter assembly 1058. In other embodiments, the eccentric pins 1104, 1108 may be integrally formed with the hub 1013.

The unitary construction of the lifter assembly 1058 increases performance and durability of the lifter assembly 1058 by reducing the number of separate assembled parts in the lifter assembly 1058. In the illustrated embodiment, the lifter assembly 1058 is formed by forging a piece of raw material (e.g., steel, aluminum, etc.) into the desired form. The recesses 1017 may be formed by machining the lifter assembly 1058 after the forging process is completed. In other embodiments, the eccentric pins 1104, 1108 may also be formed as part of the unitary body of the lifter assembly 1058 during the forging process.

Figure 26:
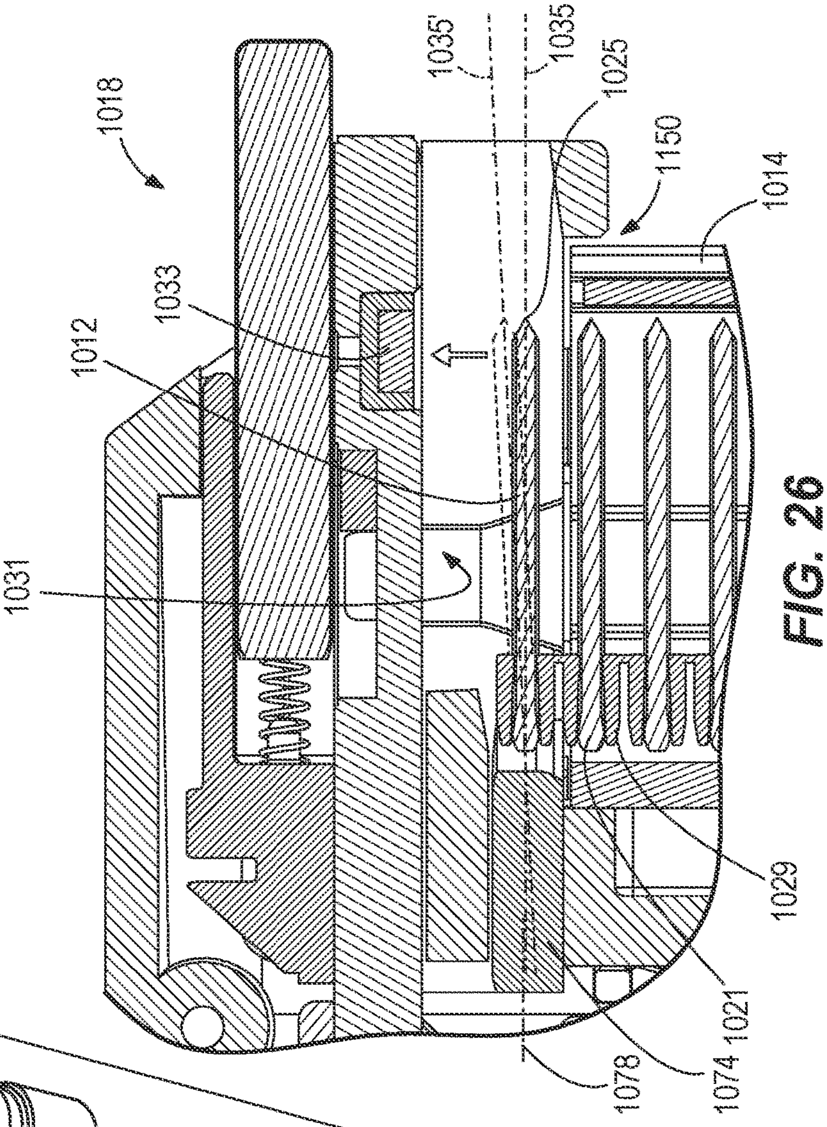
FIG. 26 is a cross-sectional view of a portion of the power fastener driver of FIG. 23, illustrating a fastener alignment mechanism.

Now with reference to FIG. 26, the magazine 1014 is sized to receive a collated fastener strip having a plurality of fasteners 1012. Each of the fasteners 1012 includes a crown section 1021 and a tip 1025 opposing the crown section 1021. The fasteners 1012 are held in the collated fastener strip by collation tabs 1029 interconnecting the crown sections 1021 of the fasteners 1012. The nosepiece 1018 defines a fastener driving channel 1031 from which consecutive fasteners 1012 provided from the magazine 1014 are driven during each fastener driving operation.

The powered fastener driver 1010 may include a fastener alignment mechanism that urges the fastener 1012 adjacent the fastener driving channel 1031 of the nosepiece 1018 towards a loading position. In the illustrated embodiment, the alignment mechanism may include a magnetic element 1033 positioned adjacent a first, front portion 1150 of the magazine 1014 and the nosepiece 1018 of the driver 1010. In the illustrated embodiment, the magnetic element 1033 is positioned proximate a tip 1025 of the fastener 1012 adjacent the fastener driving channel 1031 of the nosepiece 1018. The magnetic element 1033 produces a magnetic force that interacts with and urges the tip 1025 of the fastener 1012 upwards from the frame of reference of FIG. 26 (i.e., towards the nosepiece 1018). The use of the magnetic element 1033 aligns the fastener 1012 with the fastener driving channel 1031 without increasing resistance during the fastener driving operation. In other embodiments, the magnetic element 1033 may be positioned adjacent other sections of the fastener 1012. Additionally, or alternatively, one or more magnetic elements 1033 may be used to ensure alignment and upward bias of the fastener 1012.

During a fastener driving event, the collation tab 1029 of the fastener 1012 positioned adjacent the fastener driving channel 1031 may break off from the adjacent collation tab, which may cause rotation of the fastener 1012. The magnetic force provided by the magnetic element 1033 counteracts the rotation caused during the breaking process of the collation tab 1029 to resist over-rotation of the fastener 1012 within the magazine 1014 (e.g., beyond the loading position) and ensures proper alignment between the fastener 1012 and the fastener driving channel 1031 prior to the fastener 1012 entering the channel 1031. In the illustrated embodiment, a fastener axis 1035 extends centrally through the fastener 1012. When the fastener 1012 is in the loading position (illustrated by a broken line outline of the fastener 1012), the tip 1025 of the fastener 1012 may be urged upwards (e.g., to pre-tilt the fastener 1012) by the magnetic element 1033, which causes a fastener axis 1035' to be non-parallel with a drive axis 1078 defined by the driver blade 1074. As the collation tab 1029 breaks, the fastener 1012 is rotated to realign the fastener axis 1035' with the fastener axis 1035 to become parallel with the drive axis 1078 defined by the driver blade 1074.

Figure 27:
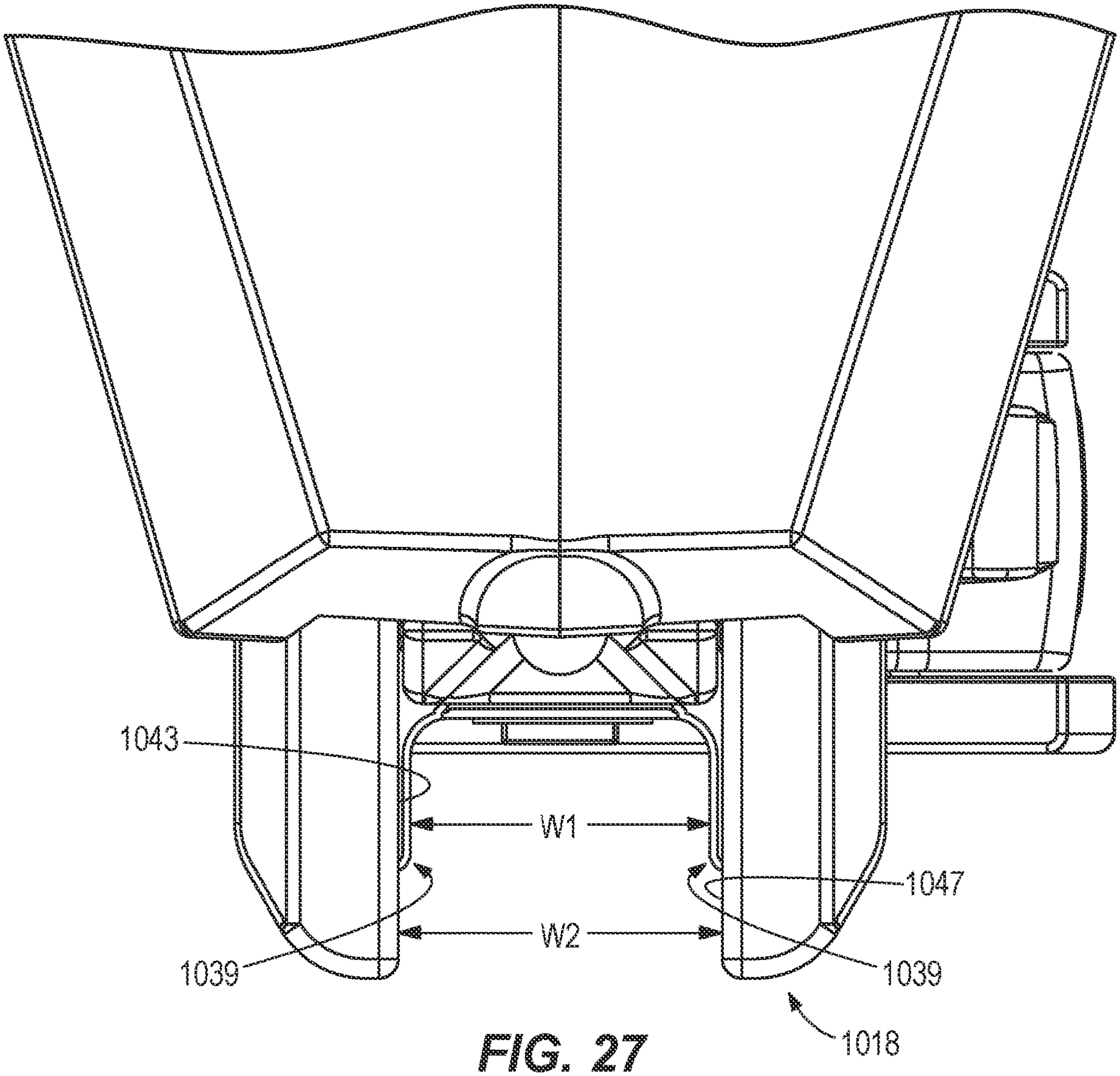
FIG. 27 is a front view of a portion of the power fastener driver of FIG. 23, illustrating the nosepiece of the power fastener driver.

Now with reference to FIG. 27, the nosepiece 1018 of the powered fastener driver 1010 includes an interior surface 1039 sized to receive a cable being secured to a workpiece during a fastener driving operation. In the illustrated embodiment, the interior surface 1039 includes a first portion 1043 having a first width W1 and a second portion 1047 having a second width W2 that is greater than the first width W1. In other words, the interior surface 1039 is stepped to accommodate different diameter cables during the fastener driving operation. In some embodiments, the second portion 1047 may be movable relative to the first portion 1043 to adjust the width of the second portion 1047 of the nosepiece 1018 to accommodate larger diameter cables. In the illustrated embodiment, the first portion of the nosepiece has a width of 15.5 millimeters and the second portion of the nosepiece has a width of 16.5 millimeters.

Although the invention has been described in detail with reference to certain preferred embodiments, variations and modifications exist within the scope and spirit of one or more independent aspects of the invention as described.

Various features of the invention are set forth in the following claims.

What is claimed is:

1. A fastener driver comprising:

a housing defining a head portion and a handle portion;

a drive mechanism positioned within the housing;

a firing mechanism including:

- a primary guide member supported within the head portion of the housing,
- a secondary guide member spaced from the primary guide member and supported within the head portion of the housing,
- a piston slidable along the primary guide member, wherein the primary guide member extends through the piston, a driver blade attached to the piston and configured to be movable along a drive axis, a biasing member configured to move the piston and the driver blade from a top dead center (TDC) position toward a bottom dead center (BDC) position; and a bracket coupled for movement with the piston, the bracket defining a bore that is sized to receive the secondary guide member, the bracket slidably supported on the secondary guide member; and a lifter assembly operated by the drive mechanism and having a pin, wherein the pin is configured to be rotated by the drive mechanism and engage the bracket to return the piston and the driver blade towards the TDC position, against the bias of the biasing member.

2. The fastener driver of claim 1, wherein the primary guide member defines a first axis, and wherein the secondary guide member defines a second axis oriented parallel with the first axis and the drive axis.

3. The fastener driver of claim 2, wherein the lifter assembly rotates about a third axis that is transverse to the first axis and the second axis.

4. The fastener driver of claim 2, wherein the piston includes a first bore that is sized to receive the primary guide member and support the piston on the primary guide member along the first axis, and wherein the bore, defined by the bracket, is a second bore.

5. The fastener driver of claim 4, wherein a cavity surrounds the first bore and is sized to receive the biasing member.

6. The fastener driver of claim 1, and wherein the secondary guide member is supported within the housing between the primary guide member and the lifter assembly.

7. The fastener driver of claim 6, wherein the bracket includes a first protrusion and a second protrusion vertically spaced from the first protrusion along the first axis, and wherein the first and second protrusions each extend towards the lifter assembly and selectively engage the pin of the lifter assembly.

8. The fastener driver of claim 7, wherein the first protrusion extends farther from the bracket than the second protrusion.

9. The fastener driver of claim 1, wherein the bracket is integrally formed with the piston.

10. The fastener driver of claim 1, further comprising:

a magazine configured to receive fasteners; and a nosepiece including a fastener driving channel, in which the driver blade is located, from which consecutive fasteners from the magazine are driven.

11. The fastener driver of claim 1, further comprising a frame located within the housing and configured to support the lifter assembly and the primary guide member.

12. A fastener driver comprising:

a housing defining a head portion and a handle portion;

a drive mechanism positioned within the housing;

a firing mechanism including:

a primary guide member supported within the head portion of the housing, a secondary guide member spaced from the primary guide member and supported within the head portion of the housing, a piston slidable along the primary guide member, wherein the primary guide member extends through the piston, a driver blade attached to the piston, a biasing member configured to move the piston and the driver blade from a top dead center (TDC) position toward a bottom dead center (BDC) position; and a bracket coupled for movement with the piston, the bracket defining a bore that is sized to receive and support the piston on the secondary guide member;

a lifter assembly operated by the drive mechanism and having a pin, wherein the pin is configured to be rotated by the drive mechanism and engage the bracket to return the piston and the driver blade towards the TDC position, against the bias of the biasing member; and a frame located within the housing and configured to support the lifter assembly and the primary guide member.

13. The fastener driver of claim 12, wherein the frame includes a first portion positioned within the head portion of the housing and a second portion positioned within the handle portion.

14. The fastener driver of claim 12, wherein the secondary guide member is supported within the housing by the frame, between the primary guide member and the lifter assembly.

15. The fastener driver of claim 14, further comprising an end cap positioned within the housing, wherein the frame is configured to support a first end of the primary guide member and a first end of the secondary guide member, and wherein the end cap is configured to support an opposite, second end of the primary guide member and an opposite, second end of the secondary guide member.

16. The fastener driver of claim 14, wherein the primary guide member defines a first axis, and wherein the secondary guide member defines a second axis oriented parallel with the first axis.

17. The fastener driver of claim 16, wherein the piston includes a first bore that is sized to receive and support the primary guide member along the first axis, and wherein a cavity surrounds the first bore and is sized to receive the biasing member.

18. The fastener driver of claim 17, wherein the drive mechanism includes a gearbox that is integrally formed with the frame.

19. The fastener driver of claim 12, further comprising:

a magazine configured to receive fasteners; and a nosepiece including a fastener driving channel, in which the driver blade is located, from which consecutive fasteners from the magazine are driven.

* * * * *